US009773300B2

United States Patent
Min et al.

(10) Patent No.: US 9,773,300 B2
(45) Date of Patent: Sep. 26, 2017

(54) METHOD AND APPARATUS FOR CORRECTING IMAGE BASED ON DISTRIBUTION OF PIXEL CHARACTERISTIC

(71) Applicant: SAMSUNG ELECTRONICS CO., LTD., Suwon-si (KR)

(72) Inventors: Byung-seok Min, Seoul (KR); Seung-ho Park, Seoul (KR); Jong-hyun Park, Seoul (KR); Il-soon Lim, Hongseong-gun (KR); Chang-su Han, Suwon-si (KR); Hyung-jun Park, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/625,256

(22) Filed: Feb. 18, 2015

(65) Prior Publication Data
US 2016/0035069 A1 Feb. 4, 2016

Related U.S. Application Data

(60) Provisional application No. 61/940,788, filed on Feb. 17, 2014.

(30) Foreign Application Priority Data

Aug. 4, 2014 (KR) .................. 10-2014-0099973

(51) Int. Cl.
*G06T 5/00* (2006.01)
*G06T 5/20* (2006.01)
*G06T 5/10* (2006.01)

(52) U.S. Cl.
CPC ................ *G06T 5/20* (2013.01); *G06T 5/002* (2013.01); *G06T 5/007* (2013.01); *G06T 5/10* (2013.01);
(Continued)

(58) Field of Classification Search
CPC .............. G06T 5/002; G06T 5/10; G06T 5/20
See application file for complete search history.

(56) References Cited

U.S. PATENT DOCUMENTS

| 5,173,949 A | * | 12/1992 | Peregrim | ............ | G01S 13/9035 |
| | | | | | 382/209 |
| 5,436,665 A | * | 7/1995 | Ueno | ................... | H04N 19/105 |
| | | | | | 375/240.14 |

(Continued)

FOREIGN PATENT DOCUMENTS

| EP | 1465436 A1 | 10/2004 |
| EP | 1515274 A1 | 3/2005 |

(Continued)

OTHER PUBLICATIONS

Rahman, et al.; "Multi-Scale Retinex for Color Image Enhancement", Proceedings of the International Conference on Image Processing, Sep. 1996, vol. 3, 4 pages total.

(Continued)

*Primary Examiner* — Utpal Shah
(74) *Attorney, Agent, or Firm* — Sughrue Mion, PLLC

(57) ABSTRACT

An image correction method includes: obtaining information regarding at least one of brightness and colors of pixels constituting an input image, the input image comprising a plurality of regions classified according to whether the at least one of the brightness and the colors of the pixels are substantially uniformly distributed in a corresponding region; determining a weight with respect to at least one pixel based on the obtained information; and correcting the input image with respect to the at least one pixel based on the determined weight.

25 Claims, 16 Drawing Sheets
(2 of 16 Drawing Sheet(s) Filed in Color)

(52) U.S. Cl.
CPC .............. *G06T 2207/10024* (2013.01); *G06T 2207/20008* (2013.01); *G06T 2207/20012* (2013.01)

(56) References Cited

U.S. PATENT DOCUMENTS

| | | | | |
|---|---|---|---|---|
| 5,477,272 | A * | 12/1995 | Zhang | G06T 7/202 348/699 |
| 5,504,847 | A * | 4/1996 | Kimura | G06T 17/20 345/420 |
| 5,644,406 | A * | 7/1997 | Harrington | G06T 9/005 382/239 |
| 5,684,895 | A * | 11/1997 | Harrington | G06T 9/00 345/545 |
| 6,975,758 | B2 * | 12/2005 | Nicolas | H04N 9/646 348/E9.042 |
| 7,822,272 | B2 | 10/2010 | Lei | |
| 9,202,267 | B1 * | 12/2015 | Yang | G06T 5/002 |
| 2003/0228064 | A1 * | 12/2003 | Gindele | G06T 5/007 382/260 |
| 2004/0001648 | A1 * | 1/2004 | Curry | G06K 9/00456 382/302 |
| 2004/0052414 | A1 * | 3/2004 | Schroder | G06T 5/20 382/167 |
| 2005/0019000 | A1 * | 1/2005 | Lim | G06T 3/4084 386/209 |
| 2005/0025383 | A1 * | 2/2005 | Domingo | G06T 5/002 382/266 |
| 2007/0070078 | A1 * | 3/2007 | Schilling | G06T 15/04 345/582 |
| 2007/0230788 | A1 | 10/2007 | Lei | |
| 2008/0044080 | A1 * | 2/2008 | Li | G06K 9/34 382/155 |
| 2008/0085061 | A1 * | 4/2008 | Arici | G06T 5/20 382/268 |
| 2008/0205784 | A1 * | 8/2008 | Akgun | G06T 3/403 382/254 |
| 2008/0298639 | A1 * | 12/2008 | Tsunekawa | G06T 3/4007 382/107 |
| 2009/0034864 | A1 * | 2/2009 | Kisilev | G06T 5/004 382/260 |
| 2009/0041373 | A1 * | 2/2009 | Incesu | G06T 7/401 382/264 |
| 2009/0072156 | A1 * | 3/2009 | Chinn | G01T 1/2985 250/363.04 |
| 2009/0110320 | A1 * | 4/2009 | Campbell | H04N 1/40062 382/260 |
| 2009/0129704 | A1 * | 5/2009 | Toda | G06T 3/4053 382/299 |
| 2009/0238535 | A1 * | 9/2009 | Robertson | G06T 3/4053 386/335 |
| 2010/0040285 | A1 * | 2/2010 | Csurka | G06K 9/00624 382/170 |
| 2010/0123806 | A1 * | 5/2010 | Li | H04N 9/045 348/241 |
| 2010/0134496 | A1 * | 6/2010 | Bhaskaran | G06T 5/002 345/428 |
| 2010/0253796 | A1 * | 10/2010 | Yano | H04N 5/2625 348/222.1 |
| 2011/0019096 | A1 | 1/2011 | Lee et al. | |
| 2011/0019931 | A1 | 1/2011 | Hamada et al. | |
| 2011/0280494 | A1 * | 11/2011 | Da Rocha Leitao | G06T 5/20 382/274 |
| 2013/0004061 | A1 * | 1/2013 | Sakurai | G06T 3/4046 382/159 |
| 2014/0015984 | A1 * | 1/2014 | Seow | H04N 17/002 348/187 |
| 2015/0071532 | A1 * | 3/2015 | Ruan | G06K 9/4604 382/165 |
| 2015/0178946 | A1 * | 6/2015 | Krishnaswamy | G06K 9/46 345/582 |
| 2015/0310595 | A1 * | 10/2015 | Peng | G06T 5/40 382/168 |

FOREIGN PATENT DOCUMENTS

| | | |
|---|---|---|
| JP | 4151225 B2 | 9/2008 |
| KR | 10-0377179 B1 | 3/2003 |
| KR | 10-0718081 B1 | 5/2007 |

OTHER PUBLICATIONS

Jobson, et al.; "A Multiscale Retinex for Bridging the Gap Between Color Images and the Human Observation of Scenes", IEEE Transactions on Image Processing, Jul. 1997, vol. 6, No. 7, 12 pages total.

Tian, et al.; "Local Histogram Modification Based Contrast Enhancement", International Conference on Audio, Language and Image Processing, Jul. 2012, 6 pages total.

Jang, et al.; "Local Contrast Enhancement Based on Adaptive Multiscale Retinex Using Intensity Distribution of Input Image", Journal of Imagine Science and Technology, Jul. 2011, vol. 55, No. 4, 14 pages total.

Meylan, et al.; "High Dynamic Range Image Rendering with a Retinex-Based Adaptive Filter", IEEE Transactions on Image Processing, Sep. 2006, vol. 15, Issue 9, 12 pages total.

"Adaptive Histogram Equalization", Wikipedia, retrieved Mar. 30, 2015, 5 pages total, http://en.wikipedia.org/wiki/Adaptive_histogram_equalization.

Jobson, et al.; "Properties and Performance of a Center/Surround Retinex", IEEE Transactions on Image Processing, Mar. 1997, vol. 6, No. 3, 12 pages total.

Vonikakis, et al.; "Fast Centre-Surround Contrast Modification", IET Image Processing, Feb. 2008, vol. 2, No. 1, 16 pages total.

Jang, et al.; "Adaptive Color Enhancement Based on Multi-Scaled Retinex Using Local Contrast of the Input Image", International Symposium on Optomechatronic Technologies (ISOT), Oct. 2010, 6 pages total.

\* cited by examiner

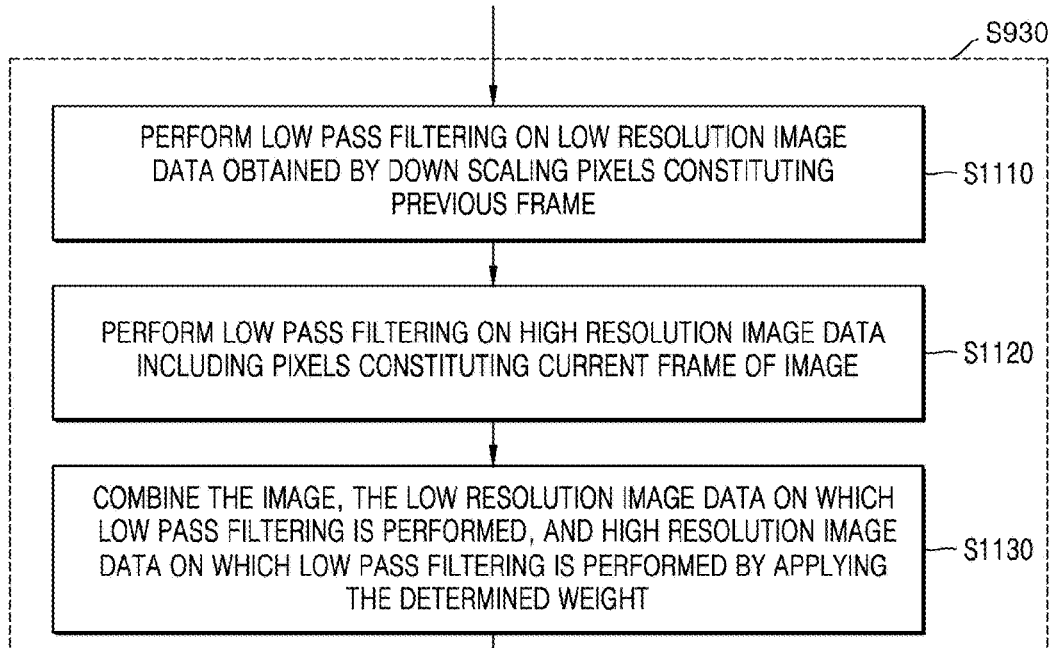
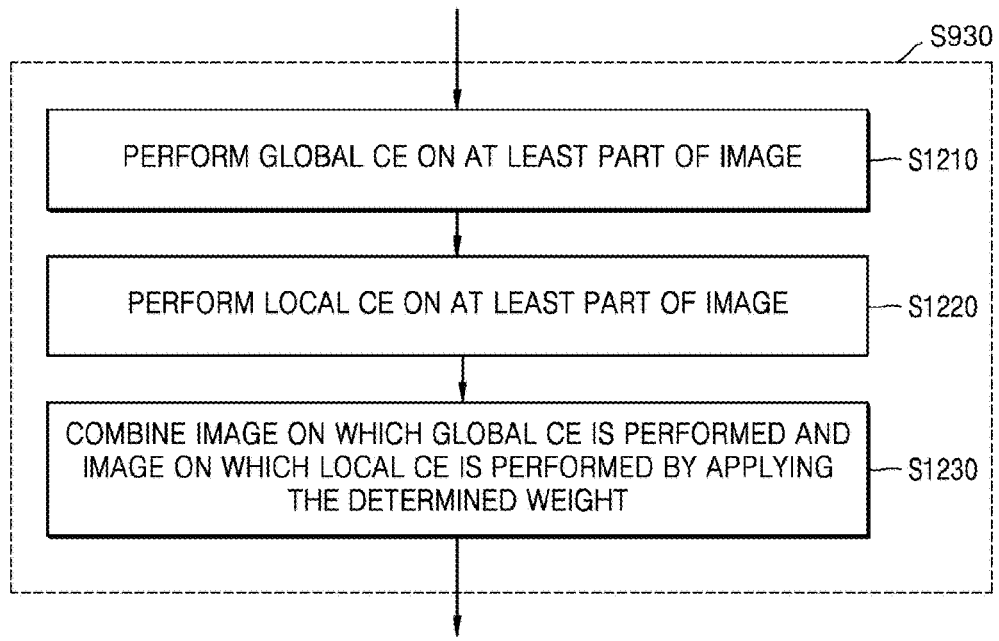

METHOD AND APPARATUS FOR CORRECTING IMAGE BASED ON DISTRIBUTION OF PIXEL CHARACTERISTIC

CROSS-REFERENCE TO RELATED APPLICATIONS

This application claims priority from U.S. Provisional Application No. 61/940,788, filed on Feb. 17, 2014, in the U.S. Patent and Trademark Office, and Korean Patent Application No. 10-2014-0099973, filed on Aug. 4, 2014, in the Korean Intellectual Property Office, the disclosures of which are incorporated herein in their entireties by reference.

BACKGROUND

1. Field

Methods and Apparatuses consistent with exemplary embodiments relate to a method and apparatus for correcting an image, and more particularly, to a method and apparatus for improving image quality by removing noise such as a false contour or a halo that may occur during a process of transmitting or processing an image.

2. Description of the Related Art

When an image is displayed on a display included in various media reproducing devices such as televisions, portable media players, smart phones, Blue-ray disc players, etc., if an input image of the display has a number of bits smaller than that of an output image, false contour noise may occur. In particular, the false contour noise may easily occur in an image including a region in which pixel values vary smoothly. Thus, there is a need for a technology for naturally expressing the region in which the pixel values vary smoothly by preventing or removing the false contour noise.

In the related art, whether there is a gradual increase or a gradual decrease in pixel values of neighboring pixels of a pixel of interest is determined, and, based on a change amount between a pixel value of the pixel of interest and the pixel values of the neighboring pixels, a region having a change amount greater than a threshold value is determined as a region including the false contour.

In more detail, the related art technology measures the change amount between the pixel value of the pixel of interest and the pixel values of the neighboring pixels, and, when there is a gradual increase or a gradual decrease in the measured change amount, determines that the pixel of interest is included in a flat region. When the change amount of the pixel values of the neighboring pixels gradually increases with a temporary decrease or gradually decreases with a temporary increase in a region of interest, the false contour is determined to be present in the region of interest.

However, a false contour detection method of the related art has a low accuracy in detecting a false contour in a general broadcast image which includes a large amount of noise. Also, a false contour detection method of the related art has a substantially low accuracy in detecting the false contour from a low gradation image having generally low pixel brightness or from an image including a low gradation region. Thus, since the related art cannot accurately detect the false contour, it is difficult to improve image quality by entirely removing the false contour.

On the other hand, contrast enhancement (CE) is an image processing method of changing values of pixels to increase contrast between the pixels included in an input image by applying, to the pixels, a function of converting colors, intensity, or brightness of the pixels included in the input image. For example, a method of performing enhancement processing on the image may include global CE and local CE.

The global CE involves applying a conversion function to an entire image. The local CE involves respectively applying different conversion functions to a plurality of regions included in the image. The local CE may have an advantage of further enhancing contrast between regions compared to the global CE. However, the local CE may cause deterioration of image quality through, for example, a halo or false contour.

The deterioration of the image quality caused by the local CE is described by way of an example in which an input image includes a wide flat region and an edge with strong intensity, and pixels of the flat region of the input image have substantially the same pixel values. Even when the pixels of the flat region of the input image have substantially the same pixel values, when the local CE is performed on the input image, different conversion functions are applied to regions of the input image. That is, different conversion functions are applied to a region adjacent to an edge and regions distanced away from the edge in the flat region.

Therefore, pixels included in the flat region adjacent to the edge and the pixels included in the flat region distanced away from the edge may have different values. That is, when the local CE is performed on the input image, the deterioration of the image quality due to, for example, a halo or false contour may occur in the flat region. Thus, a technology for preventing image quality from being deteriorated while maintaining an effect of increasing definition of an image using the local CE is needed.

SUMMARY

One or more exemplary embodiments provide a method and an apparatus for improving image quality by effectively removing a false contour present in a flat region of an image.

One or more exemplary embodiments also provide a method and an apparatus for preventing image quality from being deteriorated while maintaining an effect of increasing definition of an image using local contrast enhancement (CE).

According to an aspect of an exemplary embodiment, there is provided an image correction method including: obtaining information regarding at least one of brightness and colors of pixels constituting an input image, the input image including a plurality of regions classified according to whether the at least one of the brightness and the colors of the pixels are substantially uniformly distributed in a corresponding region; determining a weight with respect to at least one pixel of the input image based on the obtained information; and correcting the input image with respect to the at least one pixel based on the determined weight.

The determining the weight may include: dividing the input image into first blocks respectively having a first size and determining a higher resolution weight with respect to the at least one pixel by using a first block including the at least one pixel; dividing the input image into second blocks respectively having a second size greater than the first size and determining a lower resolution weight with respect to the at least one pixel by using a second block including the at least one pixel; and determining the weight with respect to the at least one pixel based on the higher resolution weight and the lower resolution weight.

The determining the weight based on the higher resolution weight and the lower resolution weight may include: determining the weight based on a greater value between the higher resolution weight and the lower resolution weight.

The determining the weight may include: determining respective weights for a plurality of pixels, the plurality of pixels being adjacent to the at least one pixel; classifying the respective weights into at least one group based on information regarding colors of the plurality of pixels; performing average filtering on weights included in the at least one group; and determining the weight based on a result of the average filtering.

The correcting the input image may include: filtering the input image by performing low pass filtering on at least a part of the input image; and combining the input image and the filtered input image by using the determined weight.

The correcting the input image may include: performing global contrast enhancement (CE) on at least a first part of the input image and performing local CE on at least a second part of the input image; and combining a result of the performing the global CE and a result of the performing the local CE by using the determined weight.

The determining the weight may include: dividing the input image into blocks respectively having a first size; obtaining a normalized variance value for each of the blocks based on values indicating brightness of pixels included in the each of the blocks; obtaining a variance based on a normalized variance value of a center block including the at least one pixel and normalized variance values of neighboring blocks neighboring the center block in a predetermined direction; and determining the weight with respect to the at least one pixel based on the obtained variance.

The determining the weight may include: dividing the input image into blocks respectively having a first size; obtaining a normalized variance value for each of the blocks based on values indicating brightness of pixels included in the each of the blocks; obtaining a variance based on a normalized variance value of a center block including the at least one pixel and normalized variance values of neighboring blocks neighboring the center block in a predetermined direction; determining a first weight with respect to the at least one pixel based on the obtained variance; determining a second weight with respect to the at least one pixel based on the normalized variance value of the center block; determining a third weight with respect to the at least one pixel based on a difference between a normalized variance value of a first region including the center block and a normalized variance value of a second region greater than the first region; determining a fourth weight with respect to the at least one pixel based on a difference between a maximum value and a minimum value of values representing colors of pixels included in the center block; and determining the weight based on at least one of the first weight, the second weight, the third weight, and the fourth weight.

The determining the weight may include: dividing the input image into blocks; determining a fifth weight with respect to the at least one pixel based on whether values indicating brightness of pixels included in a center block including the at least one pixel increase or decrease in a predetermined direction with respect to a center pixel disposed at a center of the center block; determining a sixth weight with respect to the at least one pixel based on a difference between a maximum value and a minimum value of values representing colors of the pixels included in the center block; and determining the weight based on at least one of the fifth weight and the sixth weight.

The filtering the input image may include: performing low pass filtering on lower resolution image data obtained by down scaling pixels constituting a previous frame of the input image; performing low pass filtering on higher resolution image data including pixels constituting a current frame of the input image; and combining the input image, the low pass filtered lower resolution image data, and the low pass filtered higher resolution image data by using the determined weight.

The plurality of regions may include a flat region including pixels having substantially uniform brightness and colors, a texture region including pixels corresponding to a shape or a texture of an object in the input image, and a middle region including pixels that are not included in the flat region and the texture region.

According to an aspect of another exemplary embodiment, there is provided an image correction apparatus including: a region classifier configured to obtain information regarding at least one of brightness and colors of pixels constituting an input image, the input image including a plurality of regions classified according to whether the at least one of the brightness and the colors of the pixels are substantially uniformly distributed in a corresponding region, and determine a weight with respect to at least one pixel based on the obtained information; and an image corrector configured to correct the input image with respect to the at least one pixel based on the determined weight.

The region classifier may include: a higher resolution weight determiner configured to divide the input image into first blocks respectively having a first size and determine a higher resolution weight with respect to the at least one pixel by using a first block including the at least one pixel; a lower resolution weight determiner configured to divide the input image into second blocks respectively having a second size greater than the first size and determine a lower resolution weight with respect to the at least one pixel by using a second block including the at least one pixel; and a weight combiner configured to determine the weight with respect to the at least one pixel based on the higher resolution weight and the lower resolution weight.

The weight combiner may determine the weight based on a greater value between the higher resolution weight and the lower resolution weight.

The region classifier may include: a weight determiner configured to determine weights for a plurality of pixels, the plurality of pixels being adjacent to the at least one pixel, and classify the respective weights into at least one group based on information regarding colors of the plurality of pixels; and a weight refiner configured to perform average filtering on weights included in the at least one group, wherein the weight determiner is configured to determine the weight based on a result of the average filtering.

The image corrector may include: a bit depth enhancer configured to filter the input image by performing low pass filtering on at least a part of the input image and combine the input image and the filtered input image by using the determined weight.

The image corrector may include: a contrast enhancer configured to perform global CE on at least a first part of the input image and perform local CE on at least a second part of the input image, and combine a result of the performing the global CE and a result of the performing the local CE by using the determined weight.

The region classifier may include a first weight determiner configured to divide the input image into blocks respectively having a first size, obtain a normalized variance value for each of the blocks based on values indicating brightness of pixels included in the each of the blocks, obtain a variance based on a normalized variance value of a center block including the at least one pixel and normalized variance values of neighboring blocks neighboring the center block in a predetermined direction, and determine the weight with respect to the at least one pixel based on the obtained variance.

The region classifier may include: a first weight determiner configured to divide the input image into blocks respectively having a first size, obtain a normalized variance value for each of the blocks based on values indicating brightness of pixels included in the each of the blocks, obtain a variance based on a normalized variance value of a center block including the at least one pixel and normalized variance values of neighboring blocks neighboring the center block in a predetermined direction, and determine a first weight with respect to the at least one pixel based on the obtained variance; a second weight determiner configured to determine a second weight with respect to the at least one pixel based on the normalized variance value of the center block; a third weight determiner configured to determine a third weight with respect to the at least one pixel based on a difference between a normalized variance value of a first region including the center block and a normalized variance value of a second region greater than the first region; a fourth weight determiner configured to determine a fourth weight with respect to the at least one pixel based on a difference between a maximum value and a minimum value of values representing colors of pixels included in the center block; and a weight combiner configured to determine the weight based on at least one of the first weight, the second weight, the third weight, and the fourth weight.

The region classifier may include: a fifth determiner configured to divide the input image into blocks, and determine a fifth weight with respect to the at least one pixel based on whether values indicating brightness of pixels included in a center block including the at least one pixel increase or decrease in a predetermined direction with respect to a center pixel disposed at a center of the center block; a sixth determiner configured to determine a sixth weight with respect to the at least one pixel based on a difference between a maximum value and a minimum value of values representing colors of the pixels included in the center block; and a weight combiner configured to determine the weight based on at least one of the fifth weight and the sixth weight.

The bit depth enhancer may include: a first low pass filter configured to perform low pass filtering on lower resolution image data obtained by down scaling pixels constituting a previous frame of the input image; a second low pass filter configured to perform low pass filtering on higher resolution image data including pixels constituting a current frame of the input image; and a combiner configured to combine the input image, the low pass filtered lower resolution image data, and the low pass filtered higher resolution image data by using the determined weight.

The plurality of regions may include a flat region including pixels having substantially uniform brightness and colors, a texture region including pixels corresponding to a shape or a texture of an object in the input image, and a middle region including pixels that are not included in the flat region and the texture region.

According to an aspect of still another exemplary embodiment, there is provided is a non-transitory computer readable storage medium having stored thereon a program which, when executed by a computer, causes the computer to perform an image correction method, the image correction method including: obtaining information regarding at least one of brightness and colors of pixels constituting an input image, the input image including a plurality of regions classified according to whether the at least one of the brightness and the colors of the pixels are substantially uniformly distributed in a corresponding region; determining a weight with respect to at least one pixel based on the obtained information; and correcting the input image with respect to the at least one pixel based on the determined weight.

According to an aspect of still another exemplary embodiment, there is provided an apparatus for correcting an image including: a weight determiner configured to divide an input image into a plurality of blocks and determine a weight for at least one pixel of a block based on a variance of brightness values of pixels included in the block; and an image corrector configured to correct the input image with respect to the at least one pixel based on the determined weight.

The weight determiner may determine the weight for the at least one pixel based on comparison between a normalized variance value of the brightness values of the pixels and at least one threshold.

The image corrector may correct the input image such that a pixel value of the at least one pixel in an output image is obtained by using the following equation:

$$RGB_{OUT}(i,j)=p_{ij} \cdot RGB_{IN}(i,j)+(1-p_{ij}) \cdot RGB_{LPF}(i,j),$$

wherein $RGB_{OUT}(i,j)$ represents the pixel value of the at least one pixel in the output image, $p_{ij}$ represents the weight for the at least one pixel, $RGB_{IN}(i,j)$ represents a pixel value of the at least one pixel in the input image, and $RGB_{LPF}(i,j)$ represents a pixel value of the at least one pixel in the input image on which low pass filtering is performed.

The image corrector may correct the input image such that a pixel value of the at least one pixel in an output image is obtained by using the following equation:

$$RGB_{OUT}(i,j)=p_{ij} \cdot RGB_{GLOBAL}(i,j)+(1-p_{ij}) \cdot RGB_{LOCAL}(i,j),$$

wherein $RGB_{OUT}(i,j)$ represents the pixel value of the at least one pixel in the output image, $p_{ij}$ represents the weight for the at least one pixel, $RGB_{GLOBAL}(i,j)$ represents a pixel value of the at least one pixel in the input image on which global CE is performed, and $RGB_{Local}(i,j)$ represents a pixel value of the at least one pixel in the input image on which local CE is performed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects will become more apparent by describing certain exemplary embodiments with reference to the accompanying drawings, in which:

FIG. 11 is a flowchart for explaining an image correction method based on a determined weight according to an exemplary embodiment;

FIG. 12 is a flowchart for explaining an image correction method based on a determined weight according to another exemplary embodiment;

DETAILED DESCRIPTION

Figure 1:
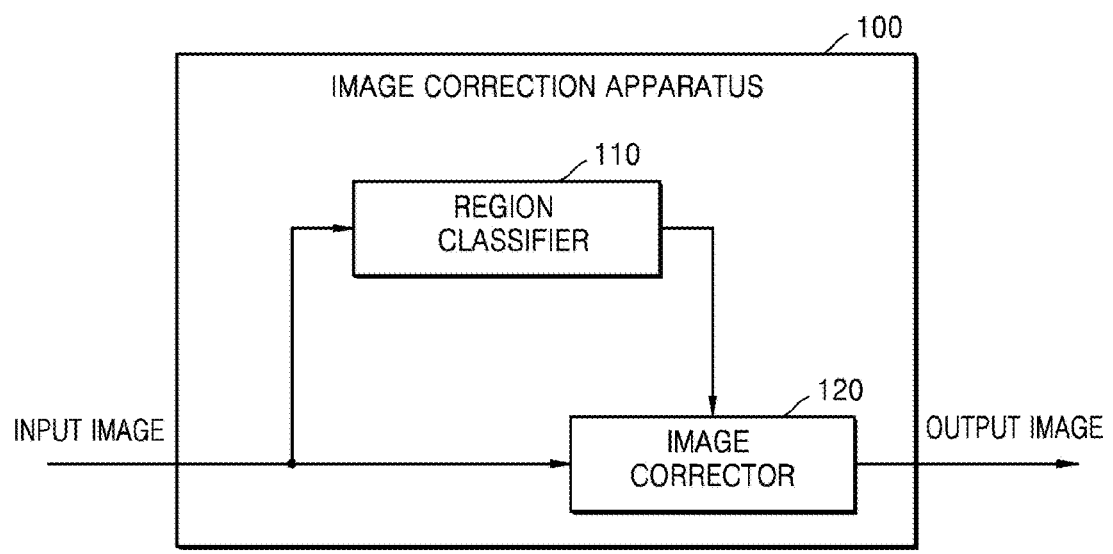
FIGS. 1 through 6 are block diagrams of an image correction apparatus according to exemplary embodiments.

Reference will now be made in detail to exemplary embodiments, examples of which are illustrated in the accompanying drawings, wherein like reference numerals refer to like elements throughout. In this regard, the exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

In the specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements.

Also, terms such as "unit", "module", etc., stated in the specification may signify a unit to process at least one function or operation and the unit may be embodied by hardware, software, or a combination of hardware and software.

In the related art, a technology of determining a region including a false contour based on whether there is a gradual increase or a gradual decrease in pixel values of pixels included in an input image is used. The related art has a disadvantage of having a substantially low accuracy in detecting a false contour from a general broadcast image having a large amount of noise and a low gradation image having generally low brightness of pixels included therein.

Thus, to overcome the above disadvantages, an original image (or high resolution image) may pass through a Kernel filter to determine whether a predetermined region included in the original image is a flat region or a texture region according to a signal change amount in the Kernel filter and analyze a signal for each region constituting the original image.

To determine whether a predetermined region of an image is a flat region, it may be needed to determine a change amount of values of pixels included in a region wider than the predetermined region. Thus, a method of determining the flat region may comprise determining a signal change amount of a low resolution image generated from the original image.

FIG. 1 is a block diagram of an image correction apparatus 100 according to an exemplary embodiment.

The image adjusting apparatus 100 of FIG. 1 may be an apparatus included in or connected to various electronic devices having an image reproduction function. For example, the image adjusting apparatus 100 may include a television, a Blu-ray disc player, a laptop computer, a digital broadcasting terminal, a personal digital assistant (PDA), a portable multimedia player (PMP), a navigation system, etc., but is not limited thereto.

As shown in FIG. 1, the image adjusting apparatus 100 according to an exemplary embodiment may include a region classifier 110 and an image corrector 120.

The region classifier 110 according to an exemplary embodiment may obtain information regarding at least one of brightness and colors of pixels included in an input image, from the input image. For example, the information regarding at least one of brightness and colors of pixels may include at least one of a value representing brightness of each pixel, a value representing a color of each pixel, and a value representing a chrominance of each pixel.

The region classifier 110 may classify the input image into a plurality of regions based on the information regarding at least one of brightness and colors of pixels. The input image may include the plurality of regions classified according to whether the brightness and the colors of the pixels are substantially uniformly distributed. For example, the region classifier 110 may classify the plurality of regions of the input image as at least one of a flat region, a texture region, and a middle region.

The flat region may include a low frequency region and/or a region having a smooth gradation. The low frequency region, which refers to a region having a dominant low frequency component of data constituting the region, may represent an object that occupies a major portion of the image.

For example, in an image of a hot air balloon floating on a clear sky, the low frequency region may correspond to a region representing the sky. The region having the smooth gradation refers to a region in which pixel values gradually increase or decrease at a small rate. In other words, the flat region may be a region including pixels having substantially uniform brightness and/or colors.

The texture region may refer to a region including an edge implementing a shape or a texture of an object which is represented by an image and/or details. The texture region that is a region having a dominant high frequency component of data constituting the region may be a region in which the data quickly changes at a short distance scale. For example, the texture region in an image representing the hot air balloon floating on the clear sky may be a region representing the hot air balloon.

The middle region may refer to a region that is not classified as the flat region or the texture region. The middle region may comprise pixels that are not included in the flat region and the texture region.

The region classifier 110 may classify the input image into the plurality of regions based on the information regarding at least one of brightness and colors of pixels and may determine a weight representing a region including at least one of the pixels. That is, the region classifier 110 may determine whether the region including at least one of the pixels is the flat region or the texture region. The region classifier 110 may determine the weight with respect to at least one pixel such that appropriate processing may be performed on the region including at least one of the pixels based on a result of determination. The determined weight may be used to correct the image.

For example, the region classifier 110 may determine a probability value indicating a probability that at least one pixel is included in the texture region as the weight representing the region including at least one of the pixels included in the image. To determine the probability value, an input image is split into a plurality of blocks for analysis. The image split into the plurality of blocks may be processed for each block.

The region classifier 110 may obtain a normalized variance value of values representing brightness of pixels included in a block including at least one pixel. The region classifier 110 may compare the obtained variance value with a threshold value to determine a probability that at least one pixel is included in the texture region. The region classifier 110 may determine a probability value for each of the pixels included in the image, generate a probability map representing the probability value for each pixel, and classify the input image into the plurality of regions based on the generated probability map.

A method of determining a weight for each pixel based on the information regarding at least one of brightness and colors of pixels included in the image will be described later in detail with reference to FIG. 6.

The region classifier 110 may determine a probability value indicating a probability that each of the pixels included in the image is included in the texture region, and classify a region based on the determined probability value. For example, the region classifier 110 may classify a region including pixels having the determined probability value of 1 as the texture region, a region including pixels having the determined probability value of 0 as the flat region, and a region including pixels having the determined probability value between 0 and 1 as the middle region.

The flat region may include false contour noise. In particular, the false contour noise may be easily generated in the flat region having a color distribution of a low variation or a substantially uniform color distribution by correcting a bit depth of the image. Thus, the false contour noise needs to be removed from the flat region to improve quality of a displayed image.

However, a texture region including minute details, a flat region including a smaller amount of noise, a region including a false contour, and a region including an edge have similar characteristics that are not easily distinguished from one another.

Therefore, the region classifier 110 according to an exemplary embodiment may increase accuracy of region classification by combining a high resolution analysis result obtained by splitting and processing an image into block units of a relatively small size and a low resolution analysis result obtained by splitting and processing the image into block units of a relatively large size. The region classifier 10 may perform an additional operation of re-classifying regions having similar characteristics after combining the high resolution analysis result and the low resolution analysis result. For example, the region classifier 110 may use a method of re-classifying the region into regions having similar colors.

It may be difficult to simultaneously obtain the high resolution analysis result and the low resolution analysis result with respect to a current frame due to a limited processing speed of the image correction apparatus 100 when processing an image in real time. Thus, the region classifier 110 according to an exemplary embodiment may classify the plurality of regions included in the image by using the high resolution analysis result and the low resolution analysis result with respect to the current frame.

The image corrector 120 according to an exemplary embodiment may correct the image based on the weight determined by the region classifier 110.

For example, the image corrector 120 may correct the image by performing processing for removing the false contour noise on the region classified as the flat region.

In more detail, the image corrector 120 according to an exemplary embodiment may apply the weight determined by the region classifier 110 in performing low pass filtering for removing noise included in the input image.

For example, the image corrector 120 may use a probability map to correct the image. The image corrector 120 may correct the image by using a probability map in which a weight of 1 is set for pixels determined to be included in the texture region and a weight of 0 is set for pixels determined to be included in the flat region.

The image corrector 120 may output data included in an original image by not applying low pass filtering on the region classified as the texture region and output filtered image data by applying low pass filtering on the region classified as the flat region. Thus, the image corrector 120 may remove the false contour included in the flat region while maintaining a shape or a texture of an object represented by the input image.

The image corrector 120 according to another exemplary embodiment may apply the weight determined by the region classifier 110 when performing local contrast enhancement (CE) on the input image.

For example, the image corrector 120 may correct the image by using the probability map in which the weight of 1 is set for pixels determined to be included in the texture region and the weight of 0 is set for pixels determined to be included in the flat region.

The image corrector 120 may perform both local CE and global CE on the input image. The image corrector 120 may output the corrected image by combining results of the local CE and global CE. The image corrector 120 may apply a higher weight to the local CE result and a lower weight to the global CE result, with respect to the region classified as the texture region.

The image corrector 120 may apply a lower weight to the local CE result and a higher weight to the global CE result, with respect to the region classified as the flat region. Thus, the image corrector 120 may substantially prevent image quality deterioration that may occur in the flat region due to local CE while maintaining an effect of increasing definition of an image through local CE.

Figure 2:
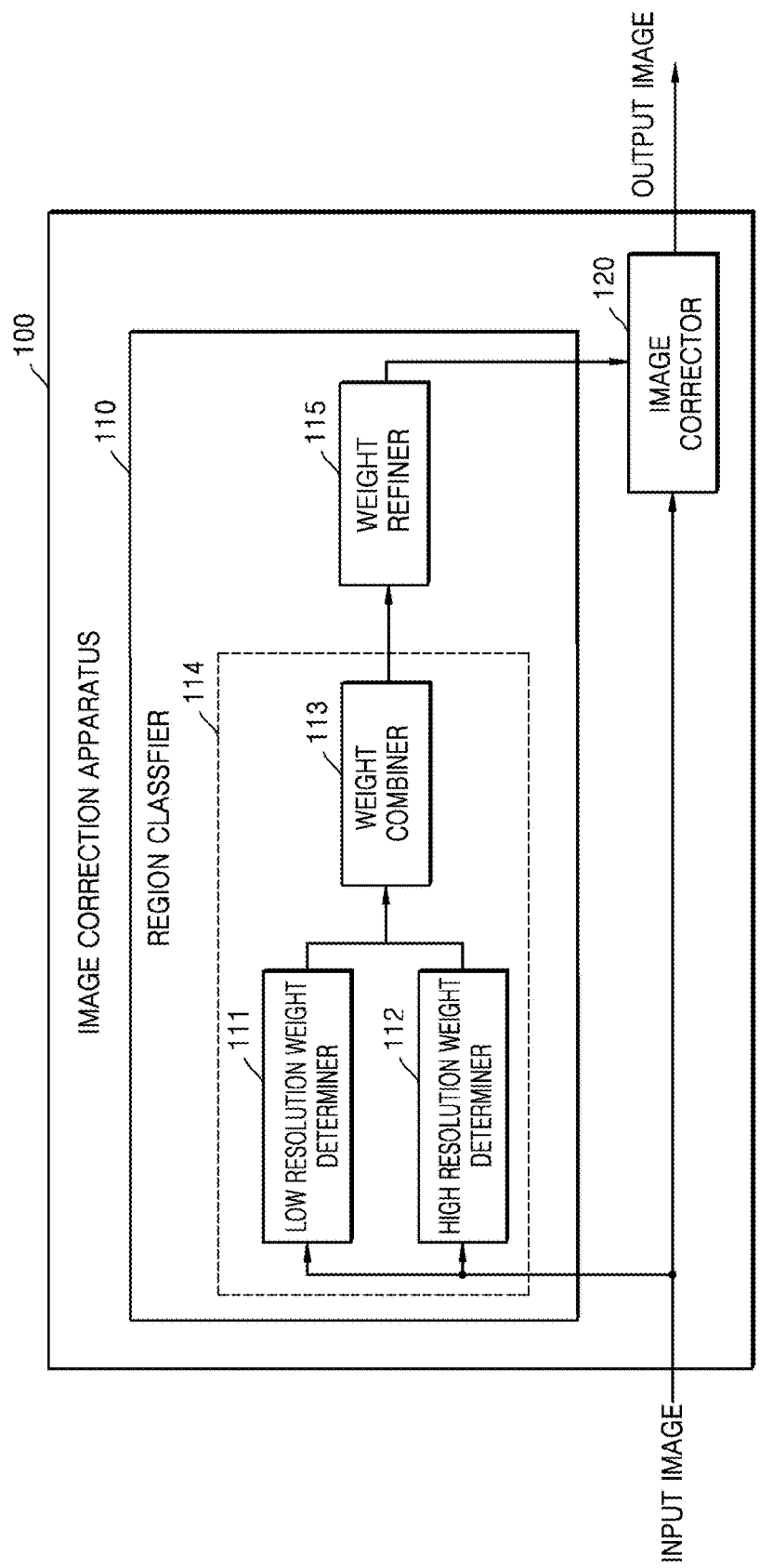

FIG. 2 is a block diagram of the image correction apparatus 100 according to an exemplary embodiment. FIG. 2 is a detailed block diagram of the region classifier 110 according to an exemplary embodiment.

The region classifier 110 according to an exemplary embodiment may use a high resolution analysis result obtained by splitting and processing an image into block units of a relatively small size and a low resolution analysis result obtained by splitting and processing the image into block units of a relatively large size, to increase accuracy of image classification.

As shown in FIG. 2, the region classifier 110 according to an exemplary embodiment may include a low resolution weight determiner 111, a high resolution weight determiner 112, and a weight combiner 113.

The high resolution weight determiner 112 may determine a high resolution weight representing a region including at least one pixel by splitting and analyzing an input image into blocks of a first size. The high resolution weight determiner 112 may determine whether the region including at least one pixel is a texture region or a flat region by analyzing pixels included in the blocks of the first size including at least one pixel. The high resolution weight determiner 112 may determine a high resolution weight with respect to the at least one pixel based on a result of determination.

For example, the high resolution weight determiner 112 may determine a probability value indicating a probability that the at least one pixel is included in the texture region as the high resolution weight representing the region including the at least one pixel. The high resolution weight determiner 112 may determine the probability value indicating a probability that the at least one pixel is included in the texture region based on a distribution of values representing brightness of peripheral pixels of the at least one pixel.

The low resolution weight determiner 111 may determine a low resolution weight representing a region including at least one pixel by splitting and analyzing the input image into blocks of a second size greater than the first size. The low resolution weight determiner 111 may determine whether the region including the at least one pixel is the texture region or the flat region by analyzing pixels included in the blocks of the second size including the at least one pixel. The low resolution weight determiner 111 may determine a low resolution weight with respect to the at least one pixel based on a result of determination.

For example, the low resolution weight determiner 111 may determine a probability value indicating a probability that the at least one pixel is included in the texture region as the low resolution weight representing the region including the at least one pixel. The low resolution weight determiner 111 may determine the probability value indicating a probability that the at least one pixel is included in the texture region based on a distribution of values representing brightness of peripheral pixels of the at least one pixel.

The weight combiner 113 may determine a weight, which represents a region including at least one pixel, with respect to the at least one pixel based on the high resolution weight and the low resolution weight. That is, the weight combiner 113 may determine a probability that the at least one pixel is included in the texture region as the weight for the at least one pixel based on the high resolution weight and the low resolution weight.

The weight combiner 113 may obtain a probability value by combining the high resolution weight and the low resolution weight. For example, the weight combiner 113 may determine a greater value between the high resolution weight and the low resolution weight and as the weight for the at least one pixel.

The region classifier 110 according to an exemplary embodiment may output the weight for the at least one pixel determined by the weight combiner 113 to the image corrector 120 but is not limited thereto.

As shown in FIG. 2, the region classifier 110 may further include a weight refiner 115.

A weight determiner 114 may determine weights for pixels. The weights for the pixels may represent respective regions including the pixels. That is, the weight determiner 114 may determine a probability that the region including the at least one pixel is the texture region, and determine the determined probability as a weight for the at least one pixel. The weight determiner 114 may generate a probability map representing a probability that each pixel constituting an image is included in the texture region and classify the input image into a plurality of regions based on the generated probability map.

The weight refiner 115 may refine the weights determined by the weight determiner 114 based on information regarding colors of the pixels. That is, the weight refiner 115 may classify the weights determined by the weight determiner 114 into at least one group based on information regarding the colors of the pixels. For example, the weight refiner 115 may classify weights mapped to a region including pixels having similar colors into one group. The weight refiner 115 may perform average filtering on the classified weights included in at least one group.

The weight refiner 115 according to an exemplary embodiment may perform average filtering only on a region having similar colors. Thus, the weight refiner 115 may accurately classify at least one of the texture region and the flat region from the image according to a shape of an object represented by the image. The region having similar colors may indicate a region in which values representing colors of pixels included in the region or values representing chrominance are within a predetermined range. The predetermined range may be experimentally determined in advance.

The weight refiner 115 may increase accuracy of region classification by performing average filtering only in the region having similar colors, and refine the probability map determined by the weight determiner 114 through an arithmetic operation of comparing an average filtered weight with a threshold value.

Figure 14A:
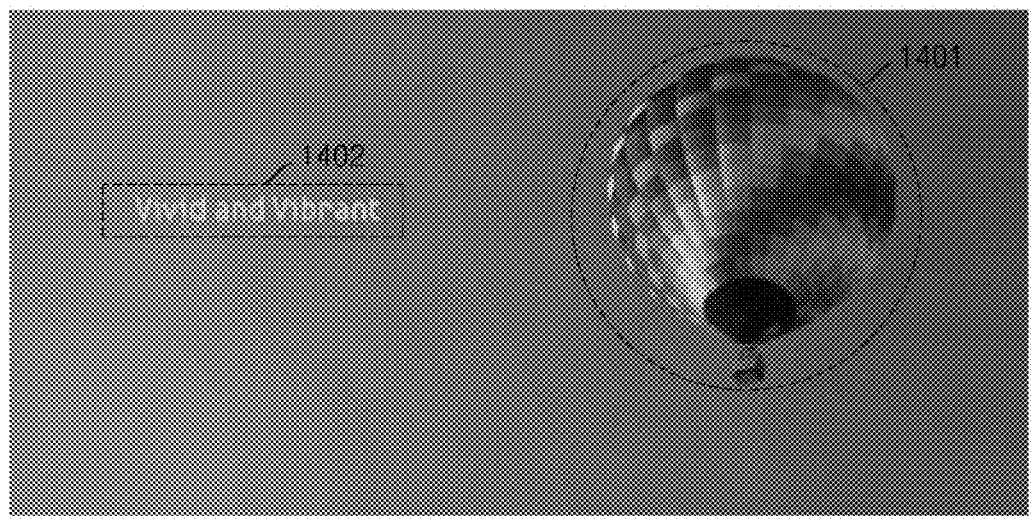
FIG. 14A is an image input to an image correction apparatus according to an exemplary embodiment.

FIG. 14A is an image input to an image correction apparatus according to an exemplary embodiment. A region 1401 representing a hot air balloon and a region 1402 representing a phrase "Vivid and Vibrant" of FIG. 14A may correspond to texture regions, and a region representing a sky that is not included in the texture regions 1401 and 1402 may correspond to a flat region.

Figure 14B:
FIG. 14B is an image that is obtained as a first result of classifying an input image into a plurality of regions according to an exemplary embodiment.

FIG. 14B is an image that is obtained as a first result of classifying an input image into a plurality of regions according to an exemplary embodiment.

FIG. 14B corresponds to a probability map mapping a value representing a probability that each of pixels included in an input image is included in a texture region. A white region of FIG. 14B is a region classified as the texture region, and a black region of FIG. 14B is a region classified as a flat region. A grey region of FIG. 14B is a region classified as a middle region, in which the higher the brightness of a grey color is allocated to a pixel, the higher the probability is that the corresponding pixel is included in the texture region. Referring to FIG. 14B, the image correction apparatus 100 according to an exemplary embodiment classifies the texture region and the flat region that are included in an image at a substantially high accuracy. However, it is shown in FIG. 14B that a part of the region 1401 representing the hot air balloon may be erroneously classified as the flat region.

Therefore, the image correction apparatus 100 according to an exemplary embodiment may refine the first result of FIG. 14B based on information regarding colors of pixels.

Figure 14C:
FIG. 14C is an image that is obtained as a second result of classifying an input image into a plurality of regions based on colors of pixels according to an exemplary embodiment.

FIG. 14C is an image that is obtained as a second result of classifying an input into a plurality of regions based on colors of pixels according to an exemplary embodiment.

A white region of FIG. 14C is a region classified as a texture region, and a black region is a region classified as a flat region. A grey region of FIG. 14C is a region classified as a middle region, in which the higher the brightness of a grey color is allocated to a pixel, the higher the probability is that the corresponding pixel is included in the texture region.

Referring to FIG. 14B, the image correction apparatus 100 according to an exemplary embodiment classifies the texture region and the flat region that are included in an image at a substantially high accuracy. However, it is shown in FIG. 14B that a part of the region 1401 representing the hot air balloon is erroneously classified as the flat region.

As shown in FIG. 14C, the image correction apparatus 100 according to an exemplary embodiment may classify the texture region and the flat region according to a shape of an object represented by an image by performing averaging processing on regions having similar colors.

Figure 3:
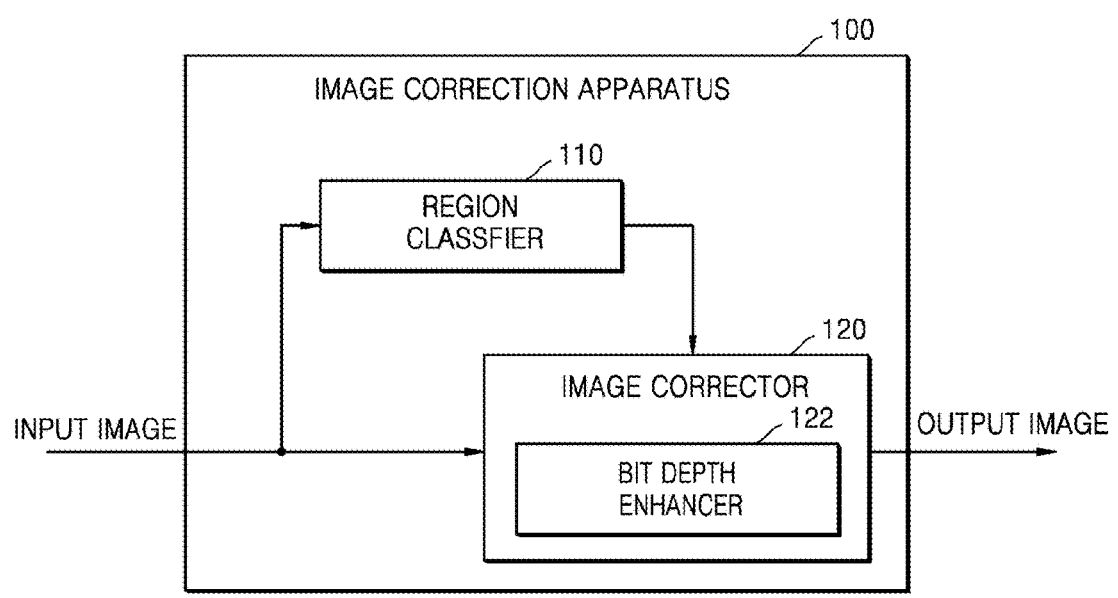

FIG. 3 is a block diagram of the image correction apparatus 100 according to an exemplary embodiment. As shown in FIG. 3, the image corrector 120 according to an exemplary embodiment may include a bit depth enhancer 122.

The bit depth enhancer 122 may perform low pass filtering on at least a part of an input image, apply the weight determined by the region classifier 110, and combine an input image and the at least a part of the input image on which low pass filtering is performed.

The bit depth enhancer 122 may include at least one low pass filter. The low pass filter included in the bit depth enhancer 122 may include a non-linear average filter including various sizes of filter tabs to remove a high frequency component of the input image.

That is, the bit depth enhancer 122 may reduce a disparity between pixel values by averaging adjacent pixels. As a result, the bit depth enhancer 122 may smooth pixel values of a flat region by using the low pass filter.

The bit depth enhancer 122 may increase a bit depth by combining a result of low pass filtering on high resolution image data of the input image and a result of low pass filtering on a low resolution image data of the input image in order to prevent image discontinuity by applying low pass filtering on a region in which pixel values of pixels gradually increase or decrease. The high resolution image data of the input image may be obtained from information regarding pixels constituting a current frame of the input image. The low resolution image data of the input image may be obtained by averaging and applying sampling on pixels constituting a previous frame of the input image. For example, the bit depth enhancer 122 may generate a 14-bit output image from an 8-bit input image.

The bit depth enhancer 122 may combine a pixel value of a predetermined pixel constituting the input image and a pixel value on which low pass filtering is performed by applying the weight determined by the region classifier 110. For example, the bit depth enhancer 122 may output a pixel value obtained from the input image with respect to a pixel determined to be included in a texture region by the region classifier 110, and may output a pixel value on which low pass filtering is performed with respect to a pixel determined to be included in a flat region by the region classifier 110.

For example, a case where a pixel value $RGB_{IN}(i,j)$ of a pixel (i, j) among pixels constituting the input image, a pixel value $RGB_{LPF}(i,j)$ of a pixel (i, j) among pixels constituting an image generated by performing low pass filtering on the input image, and a probability value $p_{ij}$ indicating a probability that the pixel (i, j) is included in the texture region are given will now be described by way of example. A pixel value $RGB_{OUT}(i,j)$ of a pixel (i, j) among pixels constituting an image output by the bit depth enhancer 122 may be expressed as Equation 1 below.

$$RGB_{OUT}(i,j)=p_{ij} \cdot RGB_{IN}(i,j)+(1-p_{ij}) \cdot RGB_{LPF}(i,j) \quad \text{[Equation 1]}$$

Figure 4:
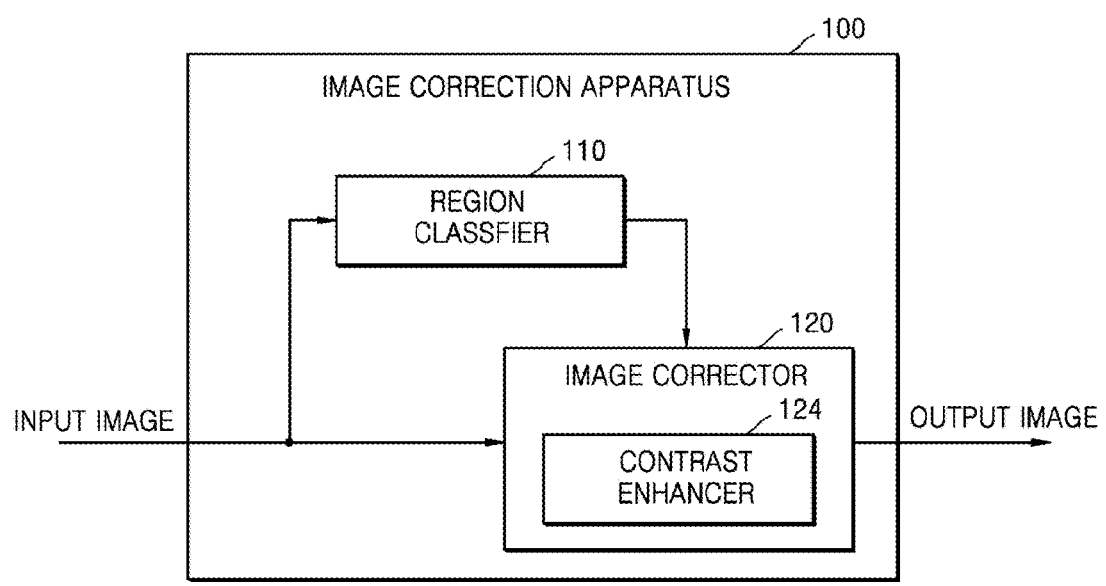

FIG. 4 is a block diagram of the image correction apparatus 100 according to an exemplary embodiment. As shown in FIG. 4, the image corrector 120 according to an exemplary embodiment may include a contrast enhancer 124.

The contrast enhancer 124 may perform global contrast enhancement (CE) and local CE on at least a part of an input image. The contrast enhancer 124 may combine an image on which global CE is performed and an image on which local CE is performed by applying the weight for at least one pixel determined by the region classifier 110.

The contrast enhancement is an image processing method for enhancing definition of an image (for example, a generally dark image or a generally bright image) in which values representing brightness of pixels included in the image are distributed within a narrow brightness value range. Contrast of an image may be defined by a histogram of the image. In more detail, the contrast enhancer 124 may apply a conversion function to at least a part of the image such that the values representing brightness of pixels included in the image are distributed in a wider range.

The contrast enhancer 124 may perform global CE by determining a conversion function that is applied to an entire input image and applying the determined conversion function to the input image.

The contrast enhancer 124 may perform local CE by splitting an input image into a plurality of blocks, determining a plurality of conversion functions with respect to the blocks, and applying different conversion functions to blocks of the input image.

The contrast enhancer 124 may determine whether each pixel contributes to formation of the flat region of the image based on the weight determined by the region classifier 110.

The contrast enhancer 124 may combine the image on which global CE is performed and the image on which local CE is performed by applying a higher weight to a result of the local CE with respect to a pixel having a lower probability of forming the flat region. That is, the contrast enhancer 124 may process the input image such that definition of the input image may increase through local CE with respect to pixels having a higher probability that the pixels are included in the texture region.

On the other hand, the contrast enhancer 124 may combine the image on which global CE is performed and the image on which local CE is performed by applying a lower weight to a local CE result with respect to a pixel having a higher probability of forming the flat region. That is, the contrast enhancer 124 may process the input image such that definition of the input image may increase through global CE, rather than local CE, with respect to pixels having a higher probability that the pixels are included in the flat region. Thus, the contrast enhancer 124 according to an exemplary embodiment selectively performs local CE based on a result of region classification performed by the region classifier 110, thereby preventing an image quality from being deteriorated due to local CE.

For example, when a pixel value $RGB_{LOCAL}(i,j)$ of a pixel (i, j) among pixels constituting an image generated by performing local CE on the input image, a pixel value $RGB_{GLOBAL}(i,j)$ of a pixel (i, j) among pixels constituting an image generated by performing global CE on the input image, and a probability value $p_{ij}$ indicating a probability that the pixel (i, j) is included in the flat region are given, a pixel value $RGB_{OUT}(i,j)$ of a pixel (i, j) among pixels constituting an image output by the contrast enhancer 124 may be expressed as Equation 2 below.

$$RGB_{OUT}(i,j) = p_{ij} \cdot RGB_{GLOBAL}(i,j) + (1-p_{ij}) \cdot RGB_{LOCAL}(i,j)$$ [Equation 2]

Figure 5:
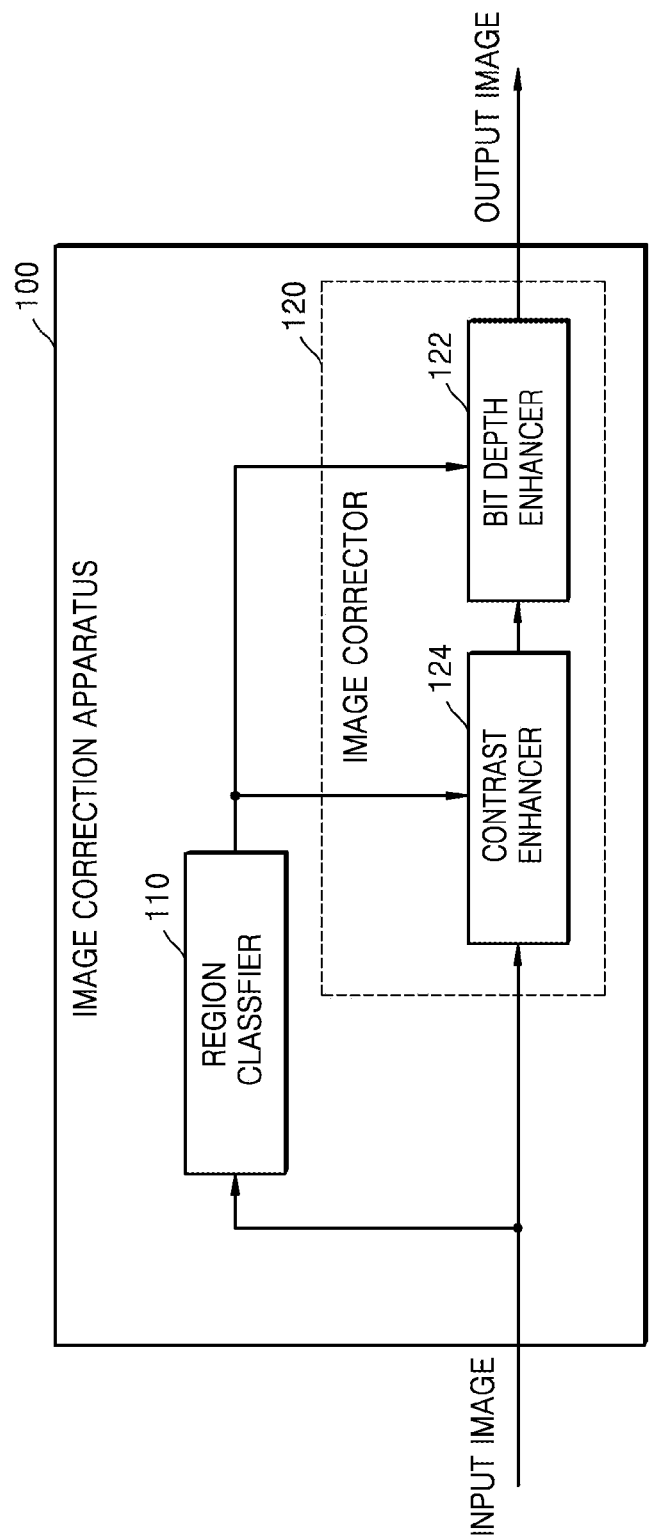

FIG. 5 is a block diagram of the image correction apparatus 100 according to an exemplary embodiment. As shown in FIG. 5, the image corrector 120 according to an exemplary embodiment may include the bit depth enhancer 122 and the contrast enhancer 124.

The bit depth enhancer 122 and the contrast enhancer 124 of FIG. 5 respectively correspond to the bit depth enhancer 122 of FIG. 3 and the contrast enhancer 124 of FIG. 4, and thus redundant descriptions thereof are omitted.

As shown in FIG. 5, the contrast enhancer 124 according to an exemplary embodiment may output an input image and an image corrected based on the weight obtained by the region classifier 110 to the bit depth enhancer 122.

The bit depth enhancer 122 may generate an output image based on the image corrected by the contrast enhancer 124 and the weight obtained by the region classifier 110.

However, the exemplary embodiments are not limited to the block diagram of FIG. 5. For example, the contrast enhancer 124 and the bit depth enhancer 122 may be operated in a reverse order such that the bit depth enhancer 122 outputs the corrected image after processing the input image, and the contrast enhancer 124 processes the corrected image output by the bit depth enhancer 122.

Figure 6:
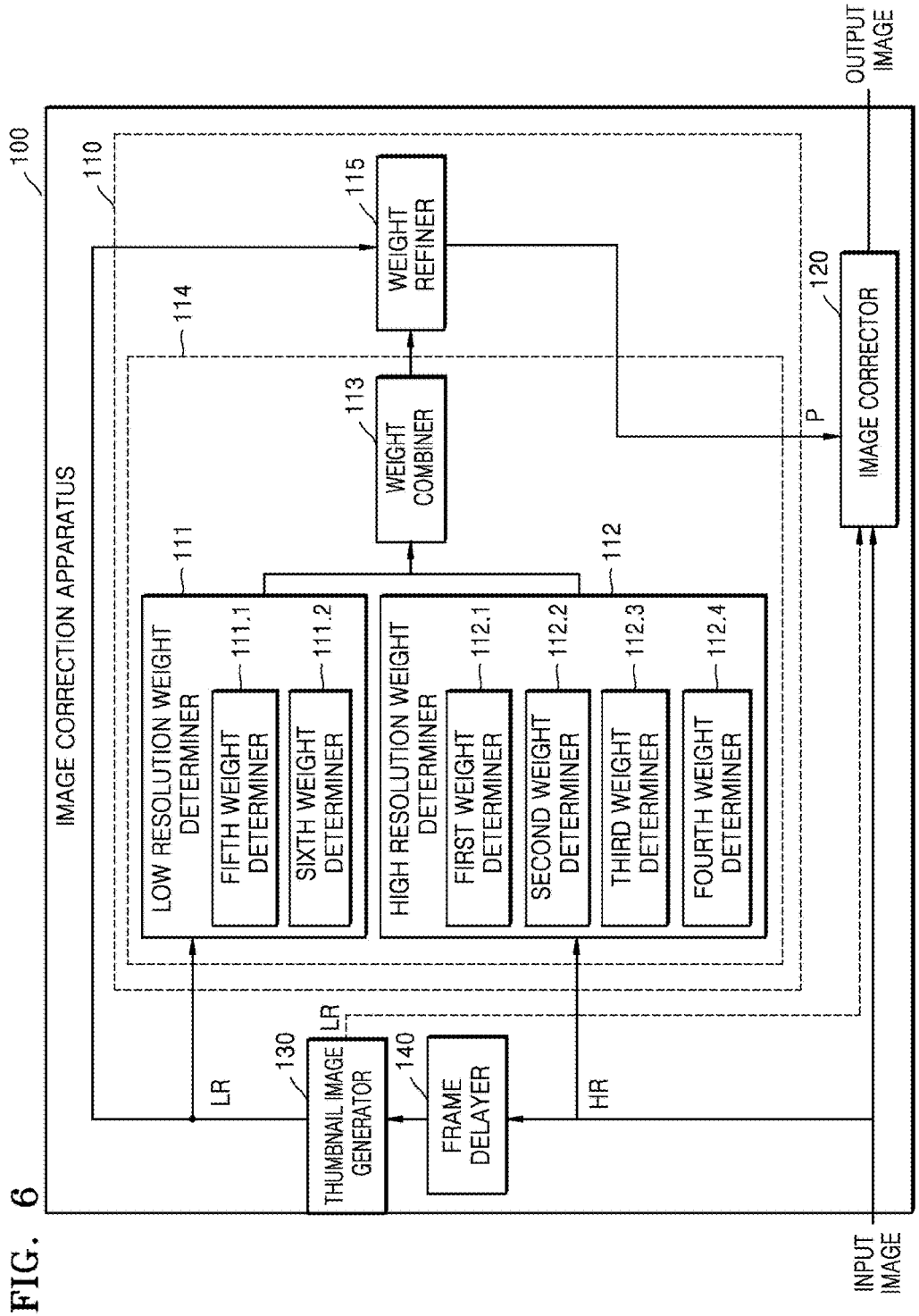

FIG. 6 is a block diagram of the image correction apparatus 100 according to an exemplary embodiment. FIG. 6 is a detailed block diagram of the region classifier 110 according to an exemplary embodiment.

As shown in FIG. 6, the image correction apparatus 100 according to an exemplary embodiment may further include a thumbnail image generator 130 and a frame delayer 140.

The region classifier 110 according to an exemplary embodiment may use both a high resolution analysis result of splitting and processing an image into block units of a relatively small size and a low resolution analysis result of splitting and processing the image into block units of a relatively large size to increase accuracy of region classification.

In this regard, it may be difficult for the region classifier 110 to simultaneously obtain a high resolution analysis result and a low resolution analysis result with respect to a current frame due to a limited processing speed in processing an image in real time. Thus, the region classifier 110 according to an exemplary embodiment may classify a plurality of regions included in the image by using the high resolution analysis result and the low resolution analysis result with respect to the current frame.

As shown in FIG. 6, the high resolution weight determiner 112 may determine a high resolution weight by analyzing a current frame of an input image.

The frame delayer 140 may delay the input image. The thumbnail image generator 130 may obtain low resolution image data by performing averaging and sampling on the delayed input image. That is, the thumbnail image generator 130 may obtain the low resolution image data by down scaling pixels constituting a previous frame.

The low resolution weight determiner 111 may determine a low resolution weight by analyzing the low resolution image data output by the thumbnail image generator 130. The previous frame may include a previously processed frame with respect to a frame (i.e. the current frame) that is being processed by the image corrector 120.

As shown in FIG. 6, the region classifier 110 according to an exemplary embodiment may determine a weight for at least one pixel by using various methods.

The region classifier 110 according to an exemplary embodiment may include the high resolution weight determiner 112 including a first weight determiner 112.1, a second weight determiner 112.2, a third weight determiner 112.3, and a fourth weight determiner 112.4. The region classifier 110 may include the low resolution weight determiner 111 including a fifth weight determiner 111.1 and a sixth weight determiner 111.2. However, the high resolution weight determiner 112 and the low resolution weight determiner 111 of exemplary embodiments are not limited thereto and may include more or less number of weight determiners.

The second weight determiner 112.2 may classify a texture region and/or a flat region from an input image by using a characteristic that a variance of values representing brightness of pixels included in the texture region is relatively large. The second weight determiner 112.2 may split the input image into block units and obtain a variance value of the values representing the brightness of the pixels included in each block. For example, the second weight determiner 112.2 may obtain the variance value of the values representing the brightness of the pixels included in each block with respect to a center pixel located at a center of each block.

The second weight determiner 112.2 may determine that at least one pixel is included in the texture region when a variance value of a center block including the at least one pixel is greater than a threshold value. However, even in a same input image, if an overall brightness of the input image is reduced by k times, a variance value of each block used to split the input image is also reduced by k times. Thus, there is a problem that a region of the input image classified as the texture region may be classified as the flat region if the overall brightness of the input image is reduced.

To improve accuracy of classifying the texture region and the flat region according to the brightness of the input image, a method of classifying the image based on a normalized variance value obtained by normalizing variance values of brightness of the input image in a window having an M×N size around the center pixel as an average brightness in the window may be used. The M×N size of the window used to normalize variance values of the brightness of the input image may be an experimentally determined optimal value.

In more detail, the second weight determiner 112.2 may split the input image into blocks having a first size and obtain a normalized variance value of values representing brightness of pixels included in each of the blocks. The second weight determiner 112.2 may obtain a normalized variance value of a center block that is a block including at least one pixel. The second weight determiner 112.2 may determine a second weight with respect to the at least one pixel based on the normalized variance value of the center block.

For example, when the normalized variance value of the center block including a center pixel (i, j) is $NV_{ij}$, the second weight determiner 112.2 may determine a weight $P_{ij}$ with respect to the center pixel (i, j) located at the center of the center block as shown in Equation 3 below.

$$P_{ij} = 1 \quad \text{if } NV_{ij} > TH_0 \quad \text{[Equation 3]}$$
$$P_{ij} = \frac{(NV_{ij} - TH_1)}{TH_0 - TH_1} \quad \text{if } TH_1 \leq NV_{ij} \leq TH_0$$
$$P_{ij} = 0 \quad \text{if } NV_{ij} < TH_1$$

TH$_0$ and TH$_1$ respectively denote previously determined threshold values to determine the weight P$_{ij}$ with respect to the center pixel (i, j). For example, TH$_0$ and TH$_1$ may be experimentally optimized values.

As shown in Equation 3 above, when the normalized variance value NV$_{ij}$ of the center block is greater than the threshold value TH$_0$, the second weight determiner 112.2 may determine that the center pixel (i, j) included in the center block is included in the texture region. That is, when a difference between the values representing the brightness of the pixels included in the center block is relatively large, the second weight determiner 112.2 may determine that the center pixel (i, j) is included in the texture region.

As shown in Equation 3 above, when the normalized variance value NV$_{ij}$ of the center block is smaller than the threshold value TH$_1$, the second weight determiner 112.2 may determine that the center pixel (i, j) included in the center block is included in the flat region. That is, when the values representing the brightness of the pixels included in the center block are relatively similar, the second weight determiner 112.2 may determine that the center pixel (i, j) is included in the flat region.

As shown in Equation 3 above, when the normalized variance value NV$_{ij}$ of the center block is smaller than or equal to the threshold value TH$_0$ and is greater than or equal to the threshold value TH$_1$, the second weight determiner 112.2 may determine that the center pixel (i, j) included in the center block is included in a middle region. The second weight determiner 112.2 may determine the weight P$_{ij}$ with respect to the center pixel (i, j) that represents whether a characteristic of the middle region including the center pixel is closer to a characteristic of the texture region or a characteristic of the flat region as a value between 0 and 1. That is, the second weight determiner 112.2 may determine the weight P$_{ij}$ with respect to the center pixel (i, j) that represents a probability that the center pixel included in the center block is included in the texture region or a probability that the center pixel included in the center block is included in the flat region as the value between 0 and 1. The second weight determiner 112.2 may determine a determined probability value as a weight for the center pixel.

Next, the third weight determiner 112.3 may distinguish the texture region including a substantially small brightness change from the flat region. The third weight determiner 112.3 may split the image into block units. And, the third weight determiner 112.3 may use a characteristic that a block included in the flat region has a similar brightness change to that of neighboring blocks, and a block included in the texture region has a greater brightness change from the neighboring blocks due to an existence of an edge or details.

In more detail, the third weight determiner 112.3 may split the input image into the blocks having the first size and obtain a normalized variance value of a first region including a center block including at least one pixel. The third weight determiner 112.3 may obtain a normalized variance value of a second region greater than the first region including the center block. The third weight determiner 112.3 may calculate a difference between the normalized variance value of the first region and the normalized variance value of the second region. The third weight determiner 112.3 may obtain a normalized variance value of a third region greater than the first region and smaller than the second region.

The third weight determiner 112.3 may obtain a multiple region based normalized variance value with respect to the center block by multiplying the normalized variance value of the third region by the difference between the normalized variance value of the first region and the normalized variance value of the second region. The third weight determiner 112.3 may determine a third weight for the at least one pixel based on the multiple region based normalized variance value.

For example, when the multiple region based normalized variance value obtained with respect to the center block including the center pixel (i, j) is MWNV$_{ij}$ (multi-window based normalized variance), the third weight determiner 112.3 may determine a third weight P$_{ij}$ with respect to the center pixel (i, j) located at the center of the center block as shown in Equation 4 below.

$$P_{ij} = 1 \quad \text{if } MWNV_{ij} > TH_2 \quad \text{[Equation 4]}$$
$$P_{ij} = \frac{MWNV_{ij} - TH_2}{(TH_3 - TH_2)} \quad \text{if } TH_3 \le MWNV_{ij} \le TH_2$$
$$P_{ij} = 0 \quad \text{if } MWNV_{ij} < TH_3$$

TH$_2$ and TH$_3$ respectively denote previously determined threshold values to determine the third weight P$_{ij}$ with respect to the center pixel (i, j). For example, TH$_2$ and TH$_3$ may be experimentally optimized values.

As shown in Equation 4 above, when the multiple region based normalized variance value MWNV$_{ij}$ obtained with respect to the center block is smaller than the threshold value TH$_3$, the third weight determiner 112.3 may determine that the center pixel (i, j) included in the center block is included in the flat region. That is, when the center block has a relatively similar brightness change to that of a peripheral region, the third weight determiner 112.3 may determine that the center pixel (i, j) is included in the flat region.

As shown in Equation 4 above, when the multiple region based normalized variance value MWNV$_{ij}$ is greater than the threshold value TH$_2$, the third weight determiner 112.3 may determine that the center pixel (i, j) included in the center block is included in the texture region. That is, when the center block and the peripheral block has a larger brightness change therebetween, the third weight determiner 112.3 may determine that the center pixel (i, j) is included in the texture region.

As shown in Equation 4 above, when the multiple region based normalized variance value MWNV$_{ij}$ is smaller than or equal to the threshold value TH$_2$ and is greater than or equal to the threshold value TH$_3$, the third weight determiner 112.3 may determine that the center pixel (i, j) included in the center block is included in the middle region. The third weight determiner 112.3 may determine the third weight P$_{ij}$ with respect to the center pixel (i, j) that represents whether a characteristic of the middle region including the center pixel is closer to a characteristic of the texture region or a characteristic of the flat region as a value between 0 and 1. That is, the third weight determiner 112.3 may determine the third weight P$_{ij}$ with respect to the center pixel (i, j) that represents a probability that the center pixel included in the center block is included in the texture region or a probability that the center pixel included in the center block is included in the flat region as the value between 0 and 1. The third weight determiner 112.3 may determine a determined probability value as a weight for the center pixel.

The center block included in the texture region including a single line (e.g. a single thin line) having an excessively small brightness difference from the peripheral region has a small normalized variance value and has a similar brightness change to that of the peripheral region. Thus, it may be difficult to distinguish the texture region including a thin line by the second weight determiner 112.2 and the third weight determiner 112.3.

The first weight determiner 112.1 may distinguish the texture region including the single line having the excessively small brightness difference from the peripheral region in the image. The first weight determiner 112.1 may split the image into block units and, when normalized variance values between blocks in a specific direction are relatively similar, the first weight determiner 112.1 may distinguish the image as the texture image.

In more detail, the first weight determiner 112.1 may split the input image into the blocks having the first size and obtain a normalized variance value of values representing brightness of pixels included in each of the blocks. The first weight determiner 112.1 may obtain a variance of normalized variance values of the center block and neighboring blocks of the center block in a predetermined direction. The first weight determiner 112.1 may determine a first weight for at least one pixel based on the variance of normalized variance values of the center block and the neighboring blocks of the center block in the predetermined direction.

Figure 13:
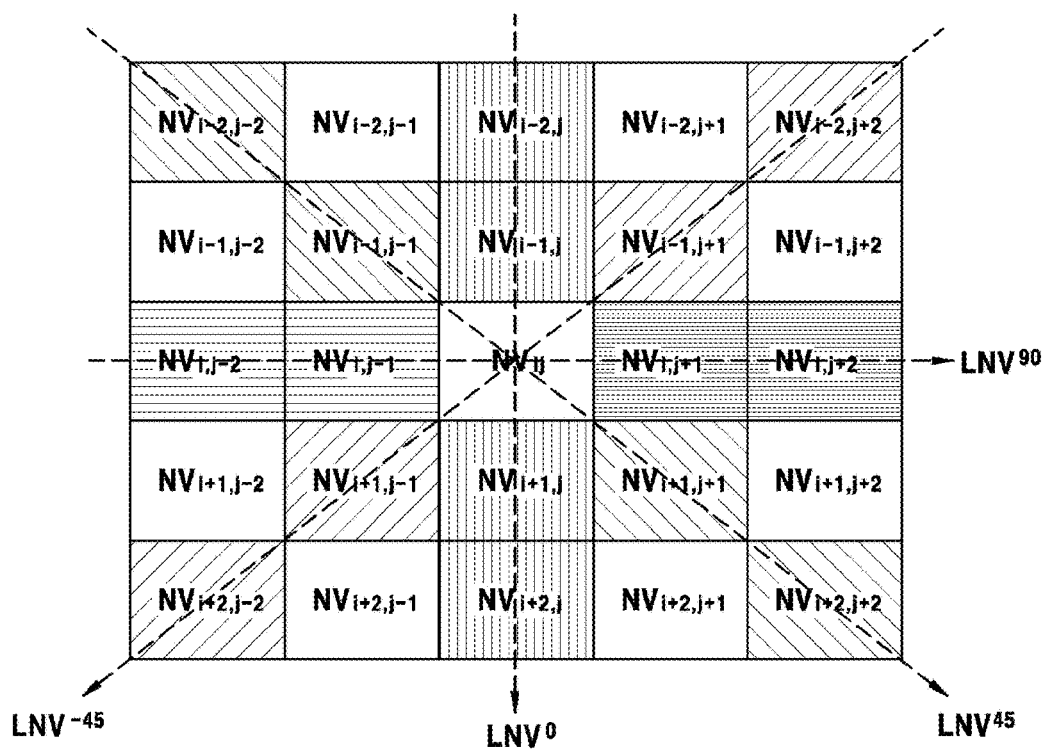
FIG. 13 is a diagram for explaining a method of determining a characteristic of a region including at least one pixel according to an exemplary embodiment.

FIG. 13 is a diagram for explaining a method of determining a characteristic of a region including at least one pixel according to an exemplary embodiment.

As shown in FIG. 13, the first weight determiner 112.1 may obtain the normalized variance value $NV_{ij}$ of a center block including a center pixel (i, j) and may obtain normalized variance values $NV_{i-2,j-2}$, $NV_{i-2,j-1}$, . . . , $NV_{i+2,j+1}$, $NV_{i+2,j+2}$ of neighboring blocks around the center block.

The first weight determiner 112.1 may obtain a variance $LNV^\theta_{i,j}$ of normalized variance values of the center block and neighboring blocks neighboring the center block in a predetermined direction indicated by an angle θ with respect to a vertical line passing the center block, when the normalized variance value $NV_{ij}$ of the center block is greater than 0. As shown in FIG. 13, the first weight determiner 112.1 may obtain at least one of a variance $LNV^{90}_{i,j}$ of normalized variance values $NV_{i,j-2}$, $NV_{i,j-1}$, $NV_{i,j+1}$, $NV_{i,j+2}$ of neighboring blocks, neighboring the center block in a horizontal direction, and the normalized variance value $NV_{ij}$ of the center block, a variance $LNV^0_{i,j}$ of normalized variance values $NV_{i-2,j}$, $NV_{i-1,j}$, $NV_{i+1,j}$, $NV_{i+2,j}$ of neighboring blocks, neighboring the center block in a vertical direction, and the normalized variance value $NV_{ij}$ of the center block, a variance $LNV^{45}_{ij}$ of normalized variance values $NV_{i-2,j-2}$, $NV_{i-1,j-1}$, $NV_{i+1,j+1}$, $NV_{i+2,j+2}$ of neighboring blocks, neighboring the center block in a diagonally downward direction from left to right, and the normalized variance value $NV_{ij}$ of the center block, and a variance $LNV^{-45}_{ij}$ of normalized variance values $NV_{i-2,j+2}$, $NV_{i-1,j+1}$, $NV_{i+1,j-1}$, $NV_{i+2,j-2}$ of neighboring blocks, neighboring the center block in a diagonally downward direction from right to left, and the normalized variance value $NV_{ij}$ of the center block.

When the normalized variance value $NV_{ij}$ of the center block including the center pixel (i, j) is greater than 0, and the variance of normalized variance values of the center block and neighboring blocks neighboring the center block in the predetermined direction indicated by the angle θ is $LNV^\theta_{i,j}$, the first weight determiner 112.1 may obtain the first weight $P_{ij}$ with respect to the center pixel (i, j) located at the center of the center block as shown in Equation 5 below.

$P_{ij}=1$ if $LNV^\theta_{ij}<TH_4$ $P_{ij}=0$ else    [Equation 5]

$TH_4$ denotes a previously determined threshold value to determine the first weight $P_{ij}$ with respect to the center pixel (i, j). For example, $TH_4$ may be an experimentally optimized value.

As shown in Equation 5 above, when the variance $LNV^\theta_{i,j}$ of normalized variance values of the center block and neighboring blocks neighboring the center block in the predetermined direction indicated by the angle θ is smaller than the threshold value $TH_4$, the first weight determiner 112.1 may determine that the center pixel (i, j) included in the center block is included in a texture region. That is, when variance values between neighboring blocks neighboring in at least one direction with respect to the center block are relatively similar, the first weight determiner 112.1 may determine that the center pixel (i, j) is included in the texture region.

Next, the fourth weight determiner 112.4 may use a characteristic that the texture region has a greater color change, and a flat region includes pixels having similar colors.

The fourth weight determiner 112.4 may split an image into block units and, when values representing colors of pixels in a block are greatly different from one another, the fourth weight determiner 112.4 may classify the image into the texture region.

In more detail, the fourth weight determiner 112.4 may split an input image into blocks having a first size and obtain values representing colors or chrominance of pixels included in each of the blocks. The fourth weight determiner 112.4 may obtain a maximum value and a minimum value of values representing colors of pixels included in a center block that is a block including at least one pixel. The fourth weight determiner 112.4 may determine a fourth weight for the at least one pixel based on a difference between the maximum value and the minimum value. When the difference between the maximum value and the minimum value is greater than a threshold value, the fourth weight determiner 112.4 may determine that the at least one pixel is included in the texture region and determine the fourth weight.

For example, the fourth weight determiner 112.4 may express the pixels included in the center block according to a color expression method using, for example, YCbCr color components, representing a brightness component and a chrominance component of each pixel. As shown in Equation 6 below, the fourth weight determiner 112.4 may calculate a chrominance deviation $K_{ij}$ with respect to the center pixel (i, j) from a weight sum of a difference between a maximum value $Y_{max}$ and a minimum value $Y_{min}$ of brightness components Y of the pixels included in the center block including the center pixel (i, j) and respective differences between maximum values $Cb_{max}$, $Cr_{max}$ and minimum values $Cb_{min}$, $Cr_{min}$ of chrominance components Cb, Cr.

$K_{ij}=w_0|Y_{max}-Y_{min}|+w_1|Cb_{max}-Cb_{min}|+w_2|Cr_{max}-Cr_{min}|$,    [Equation 6]

wherein $w_0+w_1+w_2=1$

When the chrominance deviation with respect to the center pixel (i, j) is $K_{ij}$, the fourth weight determiner 112.4 may determine a fourth weight $P_{ij}$ with respect to the center pixel (i, j) as shown in Equation 7 below.

$P_{ij} = 1$  if $K_{ij} > TH_5$    [Equation 7]

$P_{ij} = \dfrac{(K_{ij} - TH_5)}{TH_6 - TH_5}$  if $TH_6 \le K_{ij} \le TH_5$ $P_{ij} = 0$  if $K_{ij} < TH_6$ $TH_5$ and $TH_6$ respectively denote previously determined threshold values to determine the fourth weight $P_{ij}$ with respect to the center pixel (i, j). For example, $TH_5$ and $TH_6$ may be experimentally optimized values.

As shown in Equation 7 above, when the chrominance deviation $K_{ij}$ with respect to the center pixel (i, j) is greater than the threshold value $TH_5$, the fourth weight determiner 112.4 may determine that the center pixel (i, j) included in the center block is included in the texture region. That is, when the center block has a greater color change, the fourth weight determiner 112.4 may determine that the center pixel (i, j) is included in the texture region.

As shown in Equation 7 above, when the chrominance deviation $K_{ij}$ with respect to the center pixel (i, j) is smaller than the threshold value $TH_6$, the fourth weight determiner 112.4 may determine that the center pixel (i, j) included in the center block is included in the flat region. That is, when the center block has a smaller color change, the fourth weight determiner 112.4 may determine that the center pixel (i, j) is included in the flat region.

As shown in Equation 7 above, when the chrominance deviation $K_{ij}$ with respect to the center pixel (i, j) is smaller than or equal to the threshold value $TH_5$ and is greater than or equal to the threshold value $TH_6$, the fourth weight determiner 112.4 may determine that the center pixel (i, j) included in the center block is included in a middle region. The fourth weight determiner 112.4 may determine the fourth weight $P_{ij}$ with respect to the center pixel (i, j) that represents whether a characteristic of the middle region including the center pixel is closer to a characteristic of the texture region or a characteristic of the flat region as a value between 0 and 1. That is, the fourth weight determiner 112.4 may fourth weight $P_{ij}$ with respect to the center pixel (i, j) that represents a probability that the center pixel included in the center block is included in the texture region or a probability that the center pixel included in the center block is included in the flat region as the value between 0 and 1. The fourth weight determiner 112.4 may determine a determined probability value as a weight for the center pixel.

The region classifier 110 according to an exemplary embodiment may include the low resolution weight determiner 111 including the fifth weight determiner 111.1 and a sixth weight determiner 111.2. However, the low resolution weight determiner 111 of exemplary embodiments is not limited thereto and may include more or less number of weight determiners.

Unlike the high resolution weight determiner 112 that classifies the texture region and the flat region with respect to a resolution of the input image, the low resolution weight determiner 111 classifies the texture region and the flat region from the input image based on a result of analysis of low resolution image data obtained by down scaling the input image. For example, the low resolution image data obtained by down scaling the input image may be obtained by smoothing and down sampling the input image by using the thumbnail image generator 130.

When an image is observed with a narrow field of view by the high resolution weight determiner 112, a texture region having minute details may be erroneously classified as a flat region. However, if the texture region having minute details is observed with a wider field of view, the texture region may not be classified as the flat region due to an edge component disposed in the periphery thereof.

In the case of the texture region including a line or a text, as a pixel moves away from a center pixel which is disposed between edges included in the texture region, a value representing brightness of the pixel included in the texture region increases and decreases.

For example, when an image representing letters written on a white background is observed at a high resolution, regions between the letters may be erroneously classified as the flat region. When the corresponding image is observed at a low resolution, regions representing the letters may be correctly classified as the texture region. When the corresponding image is observed at a lower resolution, it may be observed that a value representing brightness of a pixel increases and decreases as the pixel moves away from a center pixel disposed between letters in a predetermined direction.

A false contour may occur in a flat region in which values representing brightness of pixels that gradually increase or decrease due to a bit depth adjustment. In this regard, a direction in which the values representing brightness of pixels increase or decrease is not changed but is maintained in the flat region irrespective of a brightness difference observed in a boundary of the false contour. The fifth weight determiner 111.1 may classify the texture region from the image by using the above characteristic.

In more detail, the fifth weight determiner 111.1 may split the image into blocks of a second size and obtain the values representing brightness of pixels included in the center block that is the block including at least one pixel. In an exemplary embodiment, the second size may be greater than the first size used to split an image in the high resolution weight determiner 112.

The fifth weight determiner 111.1 may determine a fifth weight for the at least one pixel based on whether the values representing the brightness of the pixels increase or decrease in a predetermined direction with respect to the center pixel in the center block, i.e. whether directions in which the brightness of the pixels increases or decrease are consistent in the center block.

For example, when the values representing the brightness of the pixels consistently increase or decrease in the predetermined direction in the center block including the at least pixel, the fifth weight determiner 111.1 may determine that the at least one pixel is included in the flat region. The fifth weight determiner 111.1 may determine that the at least one pixel is included in the flat region and set "0" as the weight for the at least one pixel.

When the directions in which the values of the brightness of the pixels increase or decrease are not consistent with respect to the predetermined direction in the center block including the at least one pixel, the fifth weight determiner 111.1 may determine that the at least one pixel is included in the texture region. The fifth weight determiner 111.1 may determine that the at least one pixel is included in the texture region and set "1" as the weight for the at least one pixel.

Next, the sixth weight determiner 111.2 may use a characteristic that the texture region has a greater color change, whereas the flat region includes pixels having similar colors. In general, values representing colors of pixels included in the flat region are similar. In a gradation region having a gradually increasing or decreasing brightness in which the false contour may easily occur, values representing brightness of pixels included in the gradation region are changed, whereas values representing a chrominance component such as a Cb and/or Cr channel are not greatly changed. The sixth weight determiner 111.2 may classify the flat region and the texture region from the image based on a difference between a maximum value and a minimum value of values representing colors of pixels included in a block by using the above characteristic.

In more detail, the sixth weight determiner 111.2 may split the input image into the blocks of the second size and obtain values representing colors or chrominance of pixels included in each of the blocks. The sixth weight determiner 111.2 may obtain a maximum value and a minimum value of values representing colors of the pixels included in the center block that is the block including the at least one pixel. The sixth weight determiner 111.2 may determine a sixth weight for the at least one pixel based on a difference between the maximum value and the minimum value. When the difference between the maximum value and the minimum value is greater than a threshold value, the sixth weight determiner 111.2 may determine that the at least one pixel is included in the texture region and determine the sixth weight.

For example, the sixth weight determiner 111.2 may express the pixels included in the center block according to the color expression method using, for example, YCbCr color components, representing the brightness component and the chrominance component of each pixel. As shown in Equation 8 below, the sixth weight determiner 111.2 may calculate a color deviation (or chrominance deviation) $K'_{ij}$ with respect to the center pixel (i, j) from a weight sum of respective differences between the maximum values $Cb_{max}$, $Cr_{max}$ and the minimum values $Cb_{min}$, $Cr_{min}$ of the chrominance components Cb, Cr of the pixels included in the center block including the center pixel (i, j).

$$K'_{ij}=w_1'|Cb_{max}-Cb_{min}|+w_2'|Cr_{max}-Cr_{min}|, \quad [\text{Equation 8}]$$

wherein $w_1'+w_2'=1$

When the chrominance deviation with respect to the center pixel (i, j) is $K'_{ij}$, the sixth weight determiner 111.2 may determine a sixth weight $P_{ij}$ with respect to the center pixel (i, j) as shown in Equation 9 below.

$$P_{ij} = 1 \quad \text{if } K'_{ij} > TH_7 \quad [\text{Equation 9}]$$
$$P_{ij} = \frac{(K_{ij} - TH_7)}{TH_8 - TH_7} \quad \text{if } TH_8 \leq K'_{ij} \leq TH_7$$
$$P_{ij} = 0 \quad \text{if } K'_{ij} < TH_8$$

$TH_7$ and $TH_8$ respectively denote previously determined threshold values to determine the sixth weight $P_{ij}$ with respect to the center pixel (i, j). For example, $TH_7$ and $TH_8$ may be experimentally optimized values.

As shown in Equation 9 above, when the color deviation $K'_{ij}$ between the pixels included in the center block is greater than the threshold value $TH_7$, the sixth weight determiner 111.2 may determine that the center pixel (i, j) included in the center block is included in the texture region. That is, when the center block has a greater color change, the sixth weight determiner 111.2 may determine that the center pixel (i, j) is included in the texture region.

As shown in Equation 9 above, when the color deviation $K'_{ij}$ between the pixels included in the center block is smaller than the threshold value $TH_8$, the sixth weight determiner 111.2 may determine that the center pixel (i, j) included in the center block is included in the flat region. That is, when the center block has a smaller color change, the sixth weight determiner 111.2 may determine that the center pixel (i, j) is included in the flat region.

As shown in Equation 9 above, when the color deviation $K'_{ij}$ with respect to the center pixel (i, j) is smaller than or equal to the threshold value $TH_7$ and is greater than or equal to the threshold value $TH_8$, the sixth weight determiner 111.2 may determine that the center pixel (i, j) included in the center block is included in a middle region. The sixth weight determiner 111.2 may determine the sixth weight $P_{ij}$ with respect to the center pixel (i, j) that represents a probability that the center pixel included in the center block is included in the texture region or a probability that the center pixel included in the center block is included in the flat region a value between 0 and 1. The sixth weight determiner 111.2 may determine a determined probability value as a weight for the center pixel.

The weight combiner 113 may combine the weights determined by the low resolution weight determiner 111 and the high resolution weight determiner 112 to determine a weight for the at least one pixel.

For example, the weight combiner 113 may determine the weight for the at least one pixel based on at least one of first through fourth weights determined by the high resolution weight determiner 112. Alternatively, the weight combiner 113 may determine the weight for the at least one pixel based on at least one of the fifth weight and the sixth weight determined by the low resolution weight determiner 111.

Alternatively, the weight combiner 113 may combine the first through fourth weights determined by the high resolution weight determiner 112 and the fifth and sixth weights determined by the low resolution weight determiner 111 and determine the weight for the at least one pixel. For example, the weight combiner 113 may determine a maximum value among the first through sixth weights as the weight for the at least one pixel.

For example, with respect to the pixel (i, j) of the input image, it is assumed that the first weight determined by the first weight determiner 112.1 is $P_{ij}^{HR1}$, the second weight determined by the second weight determiner 112.2 is $P_{ij}^{HR2}$, the third weight determined by the third weight determiner 112.3 is $P_{ij}^{HR3}$, the fourth weight determined by the fourth weight determiner 112.4 is $P_{ij}^{HR4}$, the fifth weight determined by the fifth weight determiner 111.1 is $P_{ij}^{LR1}$, and the sixth weight determined by the sixth weight determiner 111.2 is $P_{ij}^{LR2}$.

As shown in Equation 10 below, the weight combiner 113 may obtain the maximum value of the first through sixth weights $P_{ij}^{HR1}$, $P_{ij}^{HR2}$, $P_{ij}^{HR3}$, $P_{ij}^{HR4}$, $P_{ij}^{LR1}$, and $P_{ij}^{LR2}$ and determine the weight $P_{ij}$ with respect to the at least one pixel (i, j).

$$P_{ij}=\text{MAX}(P_{ij}^{HR1},P_{ij}^{HR2},P_{ij}^{HR3},P_{ij}^{HR4},P_{ij}^{LR1},P_{ij}^{LR2}) \quad [\text{Equation 10}]$$

The weight refiner 115 may refine the weight determined by the weight combiner 113 based on information regarding colors of pixels. The weight refiner 115 may classify regions having similar colors into one group and perform average filtering on the weights corresponding to the group.

As shown in FIG. 6, the weight refiner 115 may obtain information regarding colors of pixels included in an image from low resolution image data output by the thumbnail image generator 130. The weight refiner 115 may refine the weight determined by the weight combiner 113 based on the obtained information regarding the colors of the pixels.

The image corrector 120 may correct the input image based on the weight determined by the region classifier 110. In more detail, the image corrector 120 may perform appropriate image processing on the flat region and the texture region of the input image based on the weight determined by the region classifier 110.

For example, the image corrector 120 may apply the weight determined by the region classifier 110 to perform low pass filtering for removing noise included in the input image. For another example, the image corrector 120 may apply the weight determined by the region classifier 110 to perform local CE on the input image.

For example, the image corrector 120 may combine a result of low pass filtering performed on the high resolution image data of the input image and a result of low pass filtering performed on the low resolution image data of the input image to increase a bit depth of the input image when performing low pass filtering on the input image. In this regard, the high resolution image data of the input image may be obtained from information regarding pixels constituting a current frame of the input image. However, as shown in FIG. 6, the low resolution image data of the input image may be obtained by applying averaging and/or sampling on a previous frame of the input image in the thumbnail image generator 130.

The image corrector 120 outputs an image having a refined image quality by removing noise such as the false contour or a halo that occurs during a process of transmitting or processing an image.

Figure 7:
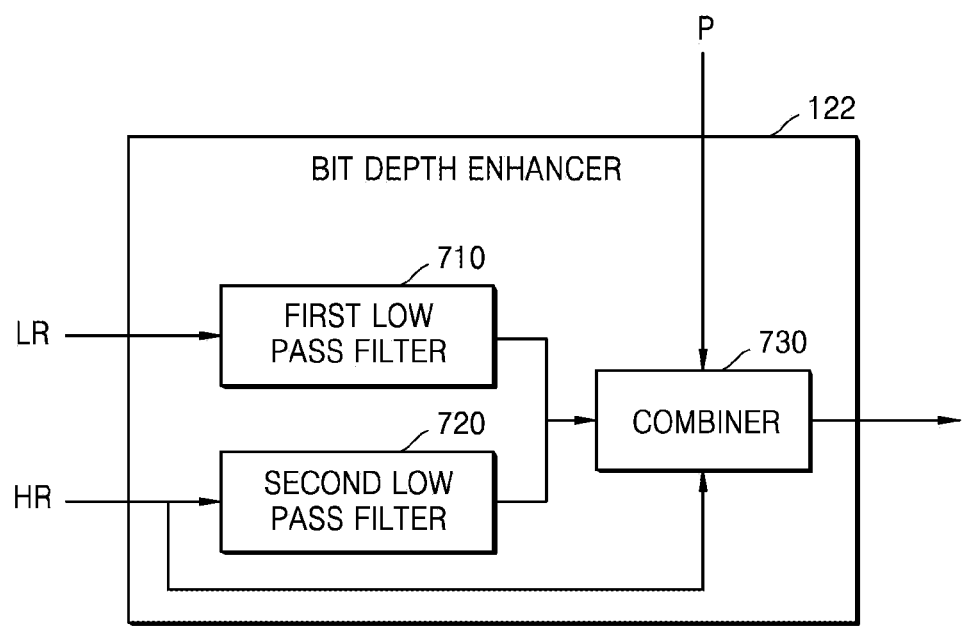
FIG. 7 is a block diagram of a bit depth enhancer included in an image correction apparatus according to an exemplary embodiment.

FIG. 7 is a block diagram of the bit depth enhancer 122 included in an image correction apparatus according to an exemplary embodiment.

Referring to FIG. 7, the bit depth enhancer 122 may include a first low pass filter 710, a second low pass filter 720, and a combiner 730.

The first low pass filter 710 may perform low pass filtering on low resolution image data LR obtained by down scaling pixels constituting a previous frame of an input image. Referring to FIG. 6, the first low pass filter 710 may obtain the low resolution image data LR by down scaling the pixels constituting the previous frame of the image from the thumbnail image generator 130.

The low resolution image data LR filtered by the first low pass filter 710 may be generated by down scaling, in the image generator 130, a frame preceding a current frame for which a bit depth adjustment operation is performed by the bit depth enhancer 122. The low resolution image data LR may be generated by down scaling a frame delayed and output from the frame delayer 140.

The second low pass filter 720 may perform low pass filtering on high resolution image data HR including pixels constituting a current frame of the image. The high resolution image data HR processed by the second low pass filter 720 may include the input image.

The combiner 730 may receive the weight P with respect to at least one pixel determined by the region classifier 110. The weight P received by the combiner 730 from the region classifier 110 may include probability values indicating a probability that each of the pixels constituting the input image is included in a texture region.

The combiner 730 may combine the input image HR, the low resolution image data LR filtered by the first low pass filter 710, and the high resolution image data HR filtered by the second low pass filter 720 by applying the weight P determined by the region classifier 110.

Firstly, the combiner 730 may generate filtered data having an increased bit depth by weight summing the low resolution image data LR filtered by the first low pass filter 710 and the high resolution image data HR filtered by the second low pass filter 720. For example, the combiner 730 may generate filtered data of 14 to 18 bits by applying low pass filtering on an input image of 8 to 10 bits.

Next, the combiner 730 may generate an output image based on the input image HR, the data HR and LR respectively filtered by the first low pass filter 710 and the second low pass filter 720, and the weight P received from the region classifier 110. For example, an image $RGP_{OUT}$ output by the combiner 730 may be generated by combining an input image $RGB_{IN}$ and the filtered data $RGB_{LPF}$ and applying the weight P according to Equation 1 above.

Although not shown in FIG. 7, the combiner 730 according to an exemplary embodiment may further include a high bit rendering unit that additionally performs a quantization operation using an error diffusion method to output an image generated by combining the filtered data of 14 to 18 bits and the input image of 8 to 10 bits to a display.

Figure 8:
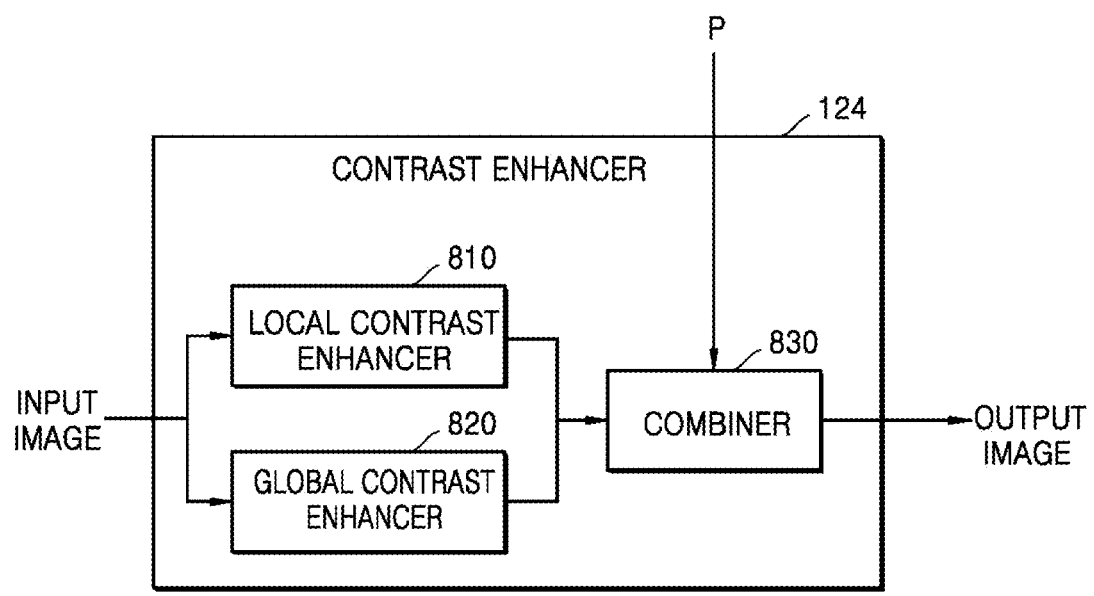
FIG. 8 is a block diagram of a contrast enhancer included in an image correction apparatus according to an exemplary embodiment.

FIG. 8 is a block diagram of the contrast enhancer 124 included in an image correction apparatus according to an exemplary embodiment.

Referring to FIG. 8, the contrast enhancer 124 may include a local contrast enhancer 810, a global contrast enhancer 820, and a combiner 830.

The local contrast enhancer 124 may perform local CE by splitting an input image into a plurality of blocks, determining a plurality of conversion functions to be applied to respective blocks, and applying different conversion functions to the respective blocks of the input image. The plurality of conversion functions may be functions used to convert values representing brightness of pixels included in each block such that values representing brightness of the pixels are distributed in a wider range.

The global contrast enhancer 820 may perform global CE by determining a conversion function that is to be applied to an entire image and applying the conversion function to the input image. The conversion function that is to be applied to the entire image may be a function used to convert the values representing the brightness of the pixels included in the image such that the values may be distributed in a wider range.

The combiner 830 may receive the weight P with respect to at least one pixel determined by the region classifier 110. The weight P received by the combiner 830 from the region classifier 110 may include respective probability values indicating a probability that each of the pixels constituting the input image is included in a texture region.

The combiner 830 may combine an image obtained by performing local CE on the input image in the local contrast enhancer 810 and an image obtained by performing global CE on the input image in the global contrast enhancer 820 by applying the weight P determined by the region classifier 110. The combiner 830 may generate an output image that is a mixture of a local CE result and a global CE result based on whether each pixel included in the image is included in a flat region or a texture region.

The combiner 830 may generate an output image based on image data processed by the local contrast enhancer 810, image data processed by the global contrast enhancer 820, and the weight P received from the region classifier 110. The image output by the combiner 830 may be generated by combining image data $RGB_{LOCAL}$ on which local CE is processed and image data $RGB_{GLOBAL}$ on which global CE is processed and applying the weight P according to Equation 2 above.

Figure 9:
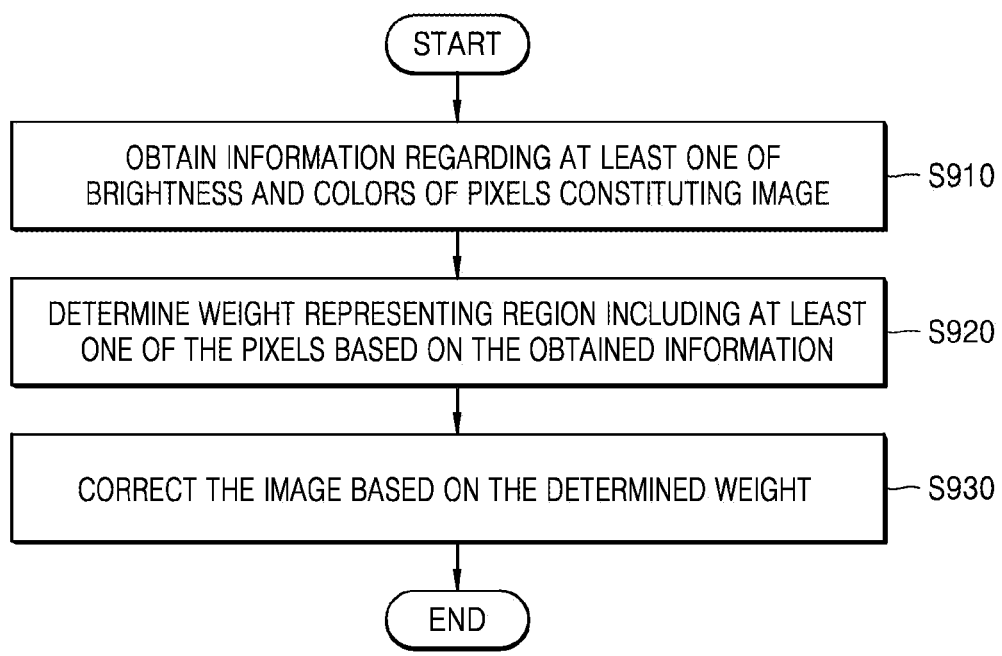
FIG. 9 is a flowchart for explaining an image correction method according to an exemplary embodiment.

FIG. 9 is a flowchart for explaining an image correction method according to an exemplary embodiment.

The image correction method of FIG. 9 may be performed by the image correction apparatus 100 of FIG. 1. In more detail, operations S910 and S920 may be performed by the region classifier 110 of FIG. 1, and operation S930 may be performed by the image corrector 120 of FIG. 1. Thus, the description of FIG. 1 applies to the image correction method of FIG. 9, and redundant descriptions are omitted.

In operation S910, the image correction apparatus 100 according to an exemplary embodiment may obtain information regarding at least one of brightness and colors of pixels constituting an image. The information regarding at least one of the brightness and colors of the pixels may include at least one of a value representing the brightness of each pixel, a value representing a color of each pixel, and a value representing a chrominance of each pixel. For example, the information regarding at least one of the brightness and colors of the pixels may be expressed according to an RGB method or a YCbCr method.

In operation S920, the image correction apparatus 100 according to an exemplary embodiment may determine a weight representing a region including at least one pixel based on the information regarding at least one of the brightness and colors of the pixels.

The image may include a plurality of regions that are distinguished according to whether brightness or colors of the pixels are substantially uniformly distributed. For example, the image may include at least one of a flat region, a texture region, and a middle region.

The image correction apparatus 100 may determine a value representing a probability that the at least one pixel is included in the texture region as a weight with respect to the at least one pixel.

Figure 10:
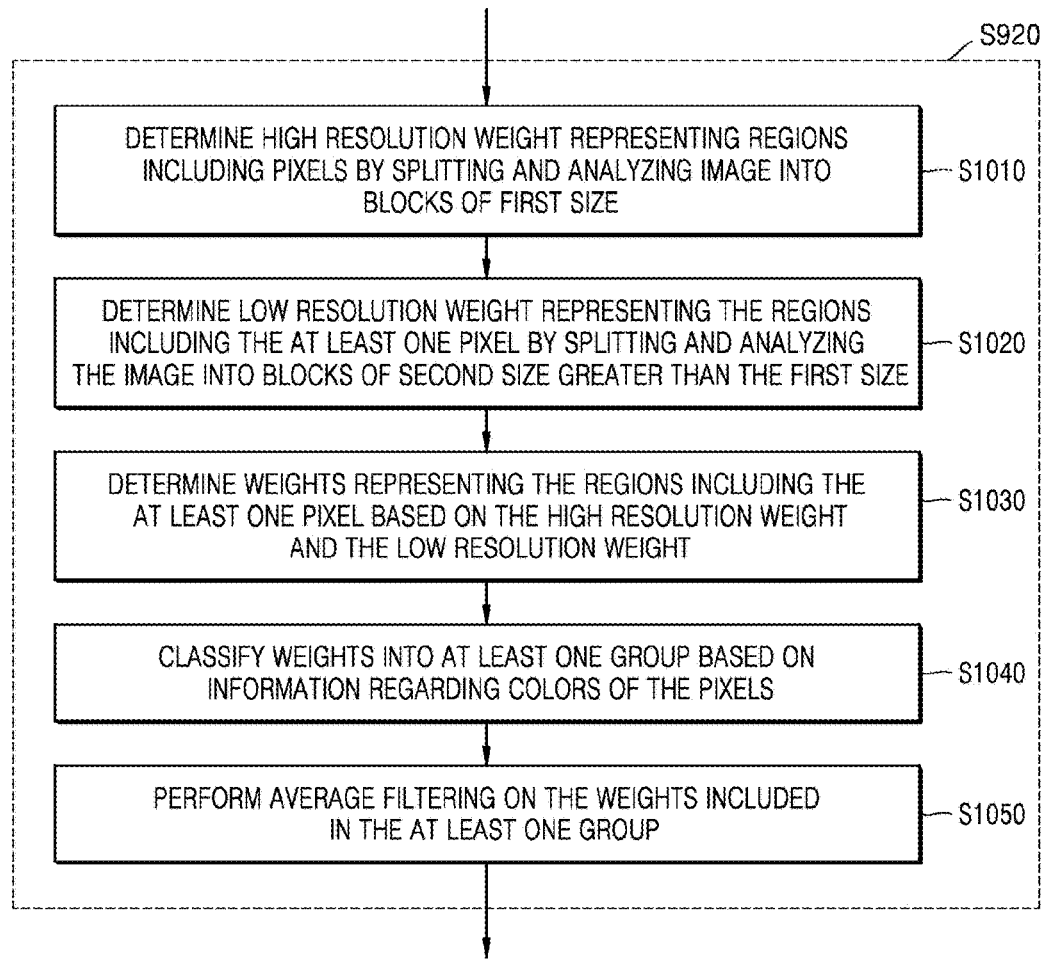
FIG. 10 is a flowchart for explaining a method of determining a weight with respect to at least one pixel according to an exemplary embodiment.

FIG. 10 is a flowchart for explaining a method of determining a weight with respect to at least one pixel according to an exemplary embodiment.

In operation S1010 of FIG. 10, the image correction apparatus 100 according to an exemplary embodiment may determine a high resolution weight representing regions including at least one pixel by splitting and analyzing an input image into blocks of a first size. The image correction apparatus 100 may determine whether the region including the at least one pixel is a texture region or a flat region by analyzing pixels included in the blocks of the first size including the at least one pixel. The image correction apparatus 100 may determine a value closer to 1 as the high resolution weight upon determining that a probability that the at least one pixel is included in the texture region is higher.

In operation S1020, the image correction apparatus 100 according to an exemplary embodiment may determine a low resolution weight representing the regions including the at least one pixel by splitting and analyzing the input image into blocks of a second size greater than the first size. The image correction apparatus 100 may determine that the region including the at least one pixel is the texture region or the flat region by analyzing the input image with a wider field of view. The image correction apparatus 100 may determine a value closer to 1 as the low resolution weight upon determining that a probability that the at least one pixel is included in the texture region is higher.

In operation S1030, the image correction apparatus 100 according to an exemplary embodiment may determine, with respect to the at least one pixel, weights representing the regions including the at least one pixel based on the high resolution weight and the low resolution weight. For example, the image correction apparatus 100 may determine a greater value between the high resolution weight and the low resolution weight as the weight with respect to the at least one pixel.

In operation S1040, the image correction apparatus 100 according to an exemplary embodiment may classify weights into at least one group based on information regarding colors of the pixels. For example, the image correction apparatus 100 may classify weights mapped to a region including pixels having similar colors into one group.

In operation S1050, the image correction apparatus 100 according to an exemplary embodiment may perform average filtering on the weights included in the at least one group. The image correction apparatus 100 may accurately classify at least one of the texture region and the flat region from the image according to a shape of an object representing the image by performing average filtering only in the region having similar colors.

In operation S930 of FIG. 9, the image correction apparatus 100 according to an exemplary embodiment may correct the image based on the weight determined in operation S920.

The image correction apparatus 100 may correct the image by performing processing for removing false contour noise with respect to the region classified as the flat region based on the weight determined in operation S920.

FIG. 11 is a flowchart for explaining an image correction method based on a determined weight according to an exemplary embodiment.

Referring to FIG. 11, the image correction apparatus 100 according to an exemplary embodiment may perform low pass filtering on at least a part of an image, applying a weight determined in operation S920, and combine an input image and the at least part of the image on which low pass filtering is performed.

In more detail, in operation S1110, the image correction apparatus 100 according to an exemplary embodiment may perform low pass filtering on low resolution image data obtained by down scaling pixels constituting a previous frame of the image. When the input image input to the image correction apparatus 100 is a moving image, the image correction apparatus 100 may use the low resolution image data obtained from a previous frame to remove a false contour included in a current frame of the image.

In operation S1120, the image correction apparatus 100 according to an exemplary embodiment may perform low pass filtering on high resolution image data including pixels constituting the current frame of the image. The high resolution image data may be original data of the input image.

In operation S1130, the image correction apparatus 100 according to an exemplary embodiment may combine an original image, the low resolution image data on which low pass filtering is performed, and high resolution image data on which low pass filtering is performed by applying the weight determined in operation S920.

The image correction apparatus 100 according to an exemplary embodiment may perform low pass filtering only on at least a part of the image by applying the weight determined in operation S920. The image correction apparatus 100 may output a pixel value obtained from the original image with respect to a pixel determined to be included in a texture region. The image correction apparatus 100 may output a low pass filtered pixel value on a pixel determined to be included in a flat region.

Therefore, the image correction apparatus 100 may refine an image quality to prevent the original image from being distorted due to unnecessary filtering with respect to the texture region while removing false contour noise from the flat region of the input image.

FIG. 12 is a flowchart for explaining an image correction method based on a determined weight according to another exemplary embodiment.

In operation S1210, the image correction apparatus 100 according to another exemplary embodiment may perform global CE on at least a part of an image. The image correction apparatus 100 may perform global CE by applying a conversion function such that a difference in brightness between pixels included in the image may increase.

In operation S1220, the image correction apparatus 100 according to an exemplary embodiment may perform local CE on at least a part of the image. The image correction apparatus 100 may perform local CE by applying a plurality of conversion functions on a plurality of regions included in the image such that the difference in brightness between pixels included in the image may increase.

In operation S1230, the image correction apparatus 100 according to an exemplary embodiment may combine an image on which global CE is performed and an image on which local CE is performed by applying a weight determined in operation S920. The weight determined in operation S920 may be a value representing a probability that each pixel included in the image is included in a texture region.

The image correction apparatus 100 may apply a greater weight to a local CE result than a global CE result with respect to pixels having a higher probability that the pixels are included in the texture region. That is, the image correction apparatus 100 may increase definition of the input image by performing local CE processing on the pixels having higher probability that the pixels are included in the texture region.

The image correction apparatus 100 may apply a greater weight to the global CE result than the local CE result with respect to pixels having a higher probability that the pixels are included in the flat region. That is, the image correction apparatus 100 may prevent an image quality from being deteriorated due to local CE by performing global CE on the pixels having higher probability that the pixels are included in the flat region.

As described above, the image correction apparatus 100 according to an exemplary embodiment may combine the local CE result and the global CE result by applying a greater weight to the local CE result with respect to pixel values that are highly probable to form the flat region. In this regard, when a size of the weight applied to a pixel has a greater change according to a change in a pixel value, a deviation of the weight increases according to a change in an input pixel value, and thus a change of an output pixel value increases. Thus, the image correction apparatus 100 according to an exemplary embodiment may stabilize an output by reducing a change width of the weight according to the change in the pixel value.

FIGS. 15A through 15D are graphs for explaining a filter for filtering a weight to be applied to correct an image according to exemplary embodiments.

Figure 15A:
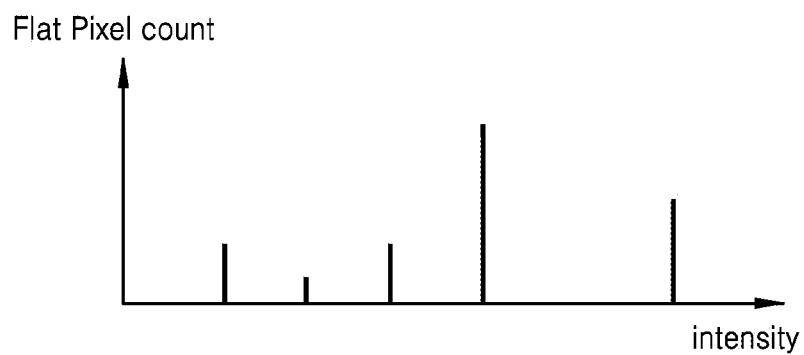
FIGS. 15A through 15D are graphs for explaining a filter for filtering a weight to be applied to correct an image according to exemplary embodiments.

Referring to FIG. 15A, the image correction apparatus 100 according to an exemplary embodiment may count the number of flat pixels included in a flat region according to each pixel value. The image correction apparatus 100 may convert the number of flat pixels included in the flat region into a flat weight by using a previously determined function. The flat weight may mean a weight to be applied to a result of performing global CE when combining a result of performing local CE and the result of performing global CE with respect to a predetermined pixel according to Equation 2 above.

Figure 15B:
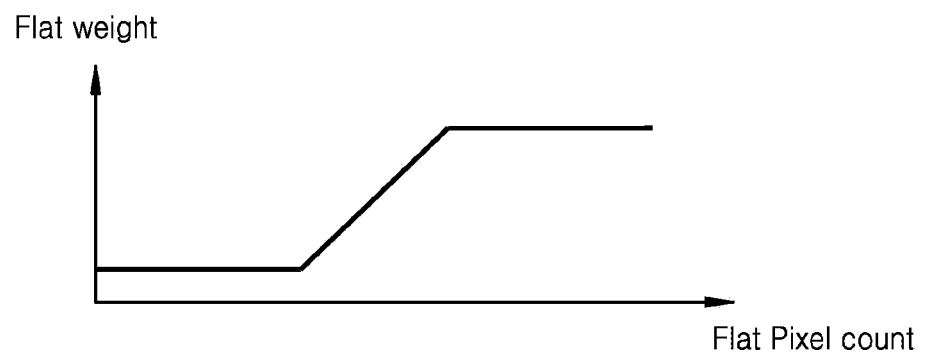

For example, the image correction apparatus 100 may convert the number of flat pixels included in the flat region into the flat weight by using a function of FIG. 15B. The image correction apparatus 100 may apply a greater flat weight to a pixel value having a greater number of flat pixels included in the flat region with respect to a predetermined range of the number of the flat pixels, as shown in FIG. 15B.

Figure 15C:
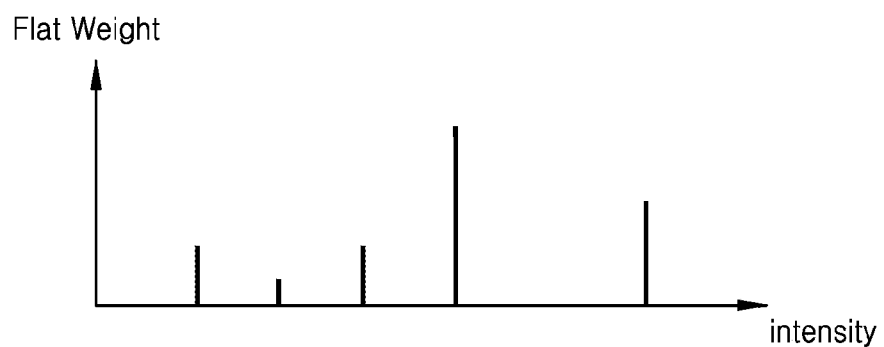

Referring to FIG. 15C, the image correction apparatus 100 may calculate the flat weight with respect to all pixel values. As shown in FIG. 15C, the flat weight may vary according to a change in the pixel value. If a deviation of the flat weight increases according to a change in an input pixel value, a change in an output pixel value also increases accordingly. That is, as shown in FIG. 15C, a value of the flat weight according to the change in the pixel value is not continuous, and thus, the flat weight may be greatly changed in response to a smaller change of the pixel value.

Therefore, the image correction apparatus 100 may process the flat weight according to the pixel value to continuously change in response to a continuous change of the pixel value.

Figure 15D:
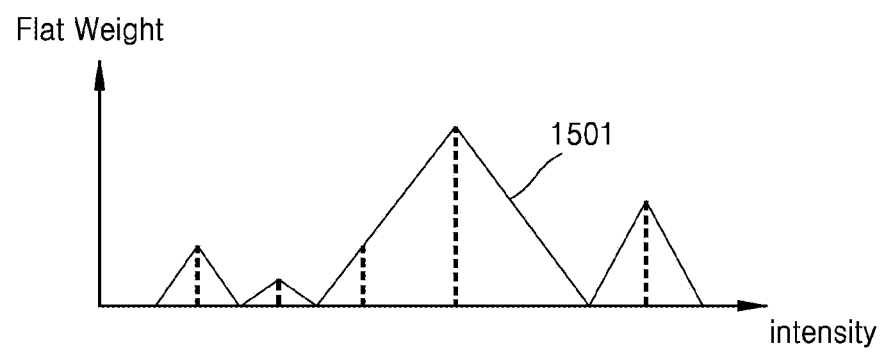

Referring to FIG. 15D, the image correction apparatus 100 may obtain a flat weight 1501 processed by smoothing the flat weight of FIG. 15C. However, the image correction apparatus 100 according to an exemplary embodiment is not limited thereto. For example, the image correction apparatus 100 may process the flat weight by applying a low pass filter or a ramp shaped filter.

As described above, the image correction apparatus 100 according to an exemplary embodiment may refine an image quality by removing noise such as a false contour that may occur during a process of transmitting and/or processing an input image, e.g., an ultra high definition (UHD) image, having a high bit number for each frame. The image correction apparatus 100 according to an exemplary embodiment may also prevent image quality deterioration while maintaining an effect of increasing definition of an image through local CE.

In addition, apparatuses and methods for image correction according to exemplary embodiments may also be implemented through computer readable code and/or instructions in and/or on a medium, e.g., a computer readable medium, to control at least one processing element to implement any of the above described exemplary embodiments. The medium may correspond to any medium and/or media permitting the storage and/or transmission of the computer readable code.

The computer readable code may be recorded and/or transferred on a medium in a variety of ways, with examples of the medium including recording media, such as magnetic storage media (e.g., read-only memories (ROMs), floppy disks, hard disks, etc.) and optical recording media (e.g., compact-disk (CD)-ROMs, or digital versatile disks (DVDs)), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored and/or transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method for refining quality of an input image, the method comprising:

obtaining information regarding at least one of brightness and colors of a plurality of pixels constituting the input image;

determining a weight with respect to at least one pixel of the input image based on the obtained information, the weight indicating a probability value that the at least one pixel is included in one of a texture region and a flat region; and performing at least one low pass filtering and contrast enhancement (CE) with respect to the at least one pixel based on the determined weight, wherein the determining the weight based on the obtained information comprises:

determining respective weights for the plurality of pixels constituting the input image based on the obtained information;

classifying the respective weights into at least one group based on information regarding the colors of the plurality of pixels; and performing average processing on weights included in the at least one group.

2. The method of claim 1, wherein the determining the weight based on the obtained information further comprises:

dividing the input image into first blocks respectively having a first size and determining a higher resolution weight with respect to the at least one pixel by using a first block including the at least one pixel; and dividing the input image into second blocks respectively having a second size greater than the first size and determining a lower resolution weight with respect to the at least one pixel by using a second block including the at least one pixel.

3. The method of claim 2, wherein the determining the weight based on the obtained information further comprises:
determining the weight based on a greater value between the higher resolution weight and the lower resolution weight.

4. The method of claim 1, wherein the performing of the at least one of the low pass filtering and the CE comprises:

performing the low pass filtering on the input image; and combining the input image and the low pass filtered input image by using the determined weight.

5. The method of claim 1, wherein the performing of the at least one of the low pass filtering and the CE comprises:

performing global CE on the input image and performing local CE on the input image; and combining a result of the performing the global CE and a result of the performing the local CE by using the determined weight.

6. The method of claim 1, wherein the determining the weight based on the obtained information further comprises:

dividing the input image into blocks respectively having a first size;

obtaining a normalized variance value for each of the blocks based on values indicating brightness of pixels included in each of the blocks; and obtaining a variance based on a normalized variance value of a center block comprising the at least one pixel and normalized variance values of neighboring blocks neighboring the center block in a predetermined direction.

7. The method of claim 1, wherein the determining the weight based on the obtained information further comprises:

dividing the input image into blocks respectively having a first size;

obtaining a normalized variance value for each of the blocks based on values indicating brightness of pixels included in each of the blocks;

obtaining a variance based on a normalized variance value of a center block comprising the at least one pixel and normalized variance values of neighboring blocks neighboring the center block in a predetermined direction;

determining a first weight with respect to the at least one pixel based on the obtained variance;

determining a second weight with respect to the at least one pixel based on the normalized variance value of the center block;

determining a third weight with respect to the at least one pixel based on a difference between a normalized variance value of a first region comprising the center block and a normalized variance value of a second region greater than the first region; and determining a fourth weight with respect to the at least one pixel based on a difference between a maximum value and a minimum value of values representing colors of pixels included in the center block.

8. The method of claim 1, wherein the determining the weight based on the obtained information further comprises:

dividing the input image into blocks;

determining a fifth weight with respect to the at least one pixel based on whether values indicating brightness of pixels included in a center block comprising the at least one pixel increase or decrease in a predetermined direction with respect to a center pixel disposed at a center of the center block; and determining a sixth weight with respect to the at least one pixel based on a difference between a maximum value and a minimum value of values representing colors of the pixels included in the center block.

9. The method of claim 4, wherein the performing of the low pass filtering on the input image comprises:

performing the low pass filtering on lower resolution image data obtained by down scaling pixels constituting a previous frame of the input image; and performing the low pass filtering on higher resolution image data comprising pixels constituting a current frame of the input image.

10. The method of claim 1, wherein the flat region is a region comprising pixels having uniform brightness and colors, and the texture region is a region comprising pixels corresponding to a shape or a texture of an object in the input image.

11. An image quality refining apparatus, comprising at least one memory and at least one processor operably coupled with the at least one memory, wherein the at least one processor is configured to: obtain information regarding at least one of brightness and colors of a plurality of pixels constituting an input image; determine a weight with respect to at least one pixel based on the obtained information, the weight indicating a probability value that the at least one pixel is included in one of a texture region and a flat region; and perform at least one of low pass filtering and contrast enhancement (CE) with respect to the at least one pixel based on the determined weight, and wherein the at least one processor is further configured to:
determine respective weights for the plurality of pixels constituting the input image based on the obtained information; classify the respective weights into at least one group based on information regarding the colors of the plurality of pixels;
perform average processing on weights included in the at least one group; and
determine the weight based on a result of the average processing.

12. The image quality refining apparatus of claim 11, wherein the at least one processor is further configured to:
divide the input image into first blocks respectively having a first size and determine a higher resolution weight with respect to the at least one pixel by using a first block including the at least one pixel;
divide the input image into second blocks respectively having a second size greater than the first size and determine a lower resolution weight with respect to the at least one pixel by using a second block including the at least one pixel; and
determine the weight with respect to the at least one pixel based on the higher resolution weight and the lower resolution weight.

13. The image quality refining apparatus of claim 12, wherein the at least one processor is further configured to determine the weight based on a greater value between the higher resolution weight and the lower resolution weight.

14. The image quality refining apparatus of claim 11, wherein the at least one processor is further configured to:
perform the low pass filtering on the input image; and
combine the input image and the low pass filtered input image by using the determined weight.

15. The image quality refining apparatus of claim 11, wherein the at least one processor is further configured to: perform global CE on the input image and perform local CE on the input image; and combine a result of the global CE and a result of the local CE by using the determined weight.

16. The image quality refining apparatus of claim 11, wherein the at least one processor is further configured to: divide the input image into blocks respectively having a first size; obtain a normalized variance value for each of the blocks based on values indicating brightness of pixels included in each of the blocks; obtain a variance based on a normalized variance value of a center block comprising the at least one pixel and normalized variance values of neighboring blocks neighboring the center block in a predetermined direction; and determine the weight with respect to the at least one pixel based on the obtained variance.

17. The image quality refining apparatus of claim 11, wherein the at least one processor is further configured to:
divide the input image into blocks respectively having a first size; obtain a normalized variance value for each of the blocks based on values indicating brightness of pixels included in each of the blocks; obtain a variance based on a normalized variance value of a center block comprising the at least one pixel and normalized variance values of neighboring blocks neighboring the center block in a predetermined direction; determine a first weight with respect to the at least one pixel based on the obtained variance;
determine a second weight with respect to the at least one pixel based on the normalized variance value of the center block;
determine a third weight with respect to the at least one pixel based on a difference between a normalized variance value of a first region comprising the center block and a normalized variance value of a second region greater than the first region;
determine a fourth weight with respect to the at least one pixel based on a difference between a maximum value and a minimum value of values representing colors of pixels included in the center block; and
determine the weight based on at least one of the first weight, the second weight, the third weight, and the fourth weight.

18. The image quality refining apparatus of claim 11, wherein the at least one processor is further configured to:
divide the input image into blocks; determine a fifth weight with respect to the at least one pixel based on whether values indicating brightness of pixels included in a center block comprising the at least one pixel increase or decrease in a predetermined direction with respect to a center pixel disposed at a center of the center block;
determine a sixth weight with respect to the at least one pixel based on a difference between a maximum value and a minimum value of values representing colors of the pixels included in the center block; and
determine the weight based on at least one of the fifth weight and the sixth weight.

19. The image quality refining apparatus of claim 14, wherein the at least one processor is further configured to:
perform the low pass filtering on lower resolution image data obtained by down scaling pixels constituting a previous frame of the input image;
perform the low pass filtering on higher resolution image data comprising pixels constituting a current frame of the input image; and
combine the input image, the low pass filtered lower resolution image data, and the low pass filtered higher resolution image data by using the determined weight.

20. The image quality refining apparatus of claim 11, wherein the flat region is a region comprising pixels having uniform brightness and colors, and the texture region is a region comprising pixels corresponding to a shape or a texture of an object in the input image.

21. A non-transitory computer readable storage medium having stored thereon a program which, when executed by a computer, causes the computer to perform a method for refining quality of an input image, the method comprising:
obtaining information regarding at least one of brightness and colors of a plurality of pixels constituting the input image;
determining a weight with respect to at least one pixel based on the obtained information, the weight indicating a probability value that the at least one pixel is included in one of a texture region and a flat region; and
performing at least one of low pass filtering and contrast enhancement (CE) with respect to the at least one pixel based on the determined weight,
wherein the determining the weight based on the obtained information comprises:
determining respective weights for the plurality of pixels constituting the input image based on the obtained information;
classifying the respective weights into at least one group based on information regarding the colors of the plurality of pixels; and
performing average processing on weights included in the at least one group.

22. An apparatus for refining quality of an input image, comprising at least one memory and at least one processor operably coupled with the at least one memory, wherein the at least one processor is configured to:

divide the input image into a plurality of blocks;

determine a weight for at least one pixel of a block based on a variance of brightness values of a plurality of pixels included in the block, the weight indicating a probability value that the at least one pixel is included in one of a texture region and a flat region; and perform at least one of low pass filtering and contrast enhancement (CE) with respect to the at least one pixel based on the determined weight, and wherein the at least one processor is further configured to:
determine respective weights for the plurality of pixels; classify the respective weights into at least one group based on information regarding colors of the plurality of pixels included in the block; and determine the weight based on a result of performing average processing on weights included in the at least one group.

23. The apparatus of claim 22, wherein the at least one processor is further configured to determine the weight for the at least one pixel based on comparison between a normalized variance value of the brightness values of the plurality of pixels and at least one threshold.

24. The apparatus of claim 22, wherein the at least one processor is further configured to perform at least one of the low pass filtering and the CE with respect to the at least one pixel such that a pixel value of the at least one pixel in an output image is obtained by using the following equation:

$$RGB_{OUT}(i,j) = p_{ij} \cdot RGB_{IN}(i,j) + (1-p_{ij}) \cdot RGB_{LPF}(i,j),$$

wherein $RGB_{OUT}(i,j)$ represents the pixel value of the at least one pixel in the output image, $p_{ij}$ represents the weight for the at least one pixel, $RGB_{IN}(i,j)$ represents a pixel value of the at least one pixel in the input image, and $RGB_{LPF}(i,j)$ represents a pixel value of the at least one pixel in the input image on which the low pass filtering is performed.

25. The apparatus of claim 22, wherein the at least one processor is further configured to perform at least one of the low pass filtering and the CE with respect to the at least one pixel such that a pixel value of the at least one pixel in an output image is obtained by using the following equation:

$$RGB_{OUT}(i,j) = p_{ij} \cdot RGB_{GLOBAL}(i,j) + (1-p_{ij}) \cdot RGB_{LOCAL}(i,j),$$

wherein $RGB_{OUT}(i,j)$ represents the pixel value of the at least one pixel in the output image, $p_{ij}$ represents the weight for the at least one pixel, $RGB_{GLOBAL}(i,j)$ represents a pixel value of the at least one pixel in the input image on which global CE is performed, and $RGB_{Local}(i,j)$ represents a pixel value of the at least one pixel in the input image on which local CE is performed.

* * * * *